(12) United States Patent
Asahara et al.

(10) Patent No.: US 7,406,939 B2
(45) Date of Patent: Aug. 5, 2008

(54) ENGINE VIBRATION SUPPRESSION DEVICE AND SUPPRESSION METHOD THEREOF

(75) Inventors: Yasuyuki Asahara, Yokohama (JP); Kazuhiro Fujikane, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 14 days.

(21) Appl. No.: 11/557,382

(22) Filed: Nov. 7, 2006

(65) Prior Publication Data

US 2007/0101965 A1 May 10, 2007

(30) Foreign Application Priority Data

Nov. 7, 2005 (JP) .............................. 2005-322059

(51) Int. Cl.
*F02B 75/06* (2006.01)
(52) U.S. Cl. .................................................. 123/192.1
(58) Field of Classification Search .............. 123/192.1, 123/192.2; 477/3
See application file for complete search history.

(56) References Cited

U.S. PATENT DOCUMENTS

| | | | | |
|---|---|---|---|---|
| 4,922,869 A | * | 5/1990 | Kadomukai et al. ...... | 123/192.1 |
| 5,176,118 A | * | 1/1993 | Norota ........................ | 123/435 |
| 6,550,239 B2 | * | 4/2003 | Almkvist et al. .............. | 60/284 |
| 7,232,401 B2 | * | 6/2007 | Albertson ...................... | 477/2 |
| 2004/0088103 A1 | * | 5/2004 | Itow et al. ................... | 701/110 |
| 2005/0049108 A1 | * | 3/2005 | Nishizawa et al. ........... | 477/37 |
| 2006/0196463 A1 | * | 9/2006 | Pallett et al. ............. | 123/192.1 |
| 2007/0078586 A1 | * | 4/2007 | Pallett et al. ................ | 701/101 |

FOREIGN PATENT DOCUMENTS

| | | | |
|---|---|---|---|
| JP | 11-336581 A | | 12/1999 |
| JP | 2007-126073 | * | 5/2007 |
| JP | 2007-291898 | * | 11/2007 |

* cited by examiner

*Primary Examiner*—Hai H Huynh
(74) *Attorney, Agent, or Firm*—Foley & Lardner LLP

(57) ABSTRACT

A controller (20) estimates an internal cylinder pressure of an engine (1) on the basis of the operating conditions of the engine (1), torque variation in the engine (1) is calculated on the basis of the estimated internal cylinder pressure, and an opposite phase torque of the torque variation in the engine (1) is calculated as a torque correction amount. The controller (20) then calculates a torque command value for a motor generator (2) by adding the torque correction amount to a basic torque value for driving the motor generator (2) to rotate, and performs torque control such that the torque of the motor generator (2) equals the torque command value.

25 Claims, 20 Drawing Sheets

ENGINE VIBRATION SUPPRESSION DEVICE AND SUPPRESSION METHOD THEREOF

FIELD OF THE INVENTION

This invention relates to a device which suppresses engine vibration, and particularly to a device which suppresses rolling vibration.

BACKGROUND OF THE INVENTION

In a hybrid automobile in which the vehicle is driven by a combination of an engine and a motor, an idle stop, in which the engine is halted temporarily while the vehicle is stationary, is performed to reduce fuel consumption. When the vehicle is started up again after executing an idle stop, the engine is cranked by the motor and thereby restarted. However, when the engine is restarted, torque variation is generated as intake air is compressed and expanded, leading to resonance in the engine mounting system and resulting in heavy vibration.

If torque variation of an opposite phase to the torque variation is generated from the motor at this time, the torque variation can be canceled out, enabling a reduction in vibration, and hence in JP11-336581A, the torque variation in the engine is approximated by a crank angle-related third order sine wave, and torque variation of the opposite phase thereto is applied by the motor.

SUMMARY OF THE INVENTION

However, torque variation at the time of engine startup varies according to the operating conditions of the engine, and cannot be calculated accurately from the crank angle alone. For example, during a steady state operation, air taken in during the intake stroke of the engine is compressed and expanded in the compression/expansion stroke following closure of the intake valve, causing the internal pressure of the cylinder to rise and fall, and as a result, torque variation is generated cyclically. During engine startup, however, if one of the cylinders was in the middle of the compression stroke when the vehicle stopped, compression at the time of startup begins from the stoppage point in this cylinder and not when the intake valve is closed, and hence the internal pressure of the cylinder is smaller than usual, leading to a reduction in torque variation.

Furthermore, when the intake air is throttled by a throttle, the intake air pressure is approximately 1 atmosphere immediately after startup, but as rotation increases, negative pressure gradually develops, leading to a reduction in the intake air pressure, and hence the torque variation decreases correspondingly.

Further, when the opening and closing timings of the intake valve are made variable and a decompression mechanism is employed to reduce the actual compression ratio by retarding the intake valve closing timing, thereby reducing the torque variation, the torque variation varies in accordance with the intake valve closing timing.

Since torque variation varies in accordance with the operating conditions, and particularly during engine startup, it is impossible to calculate the torque variation accurately with the method described in JP11-336581A, in which the torque variation is calculated on the basis of the crank angle alone, and therefore an increase in vibration of the vehicle body accompanying resonance in the engine mounting system cannot be wholly prevented.

This invention has been designed in consideration of such technical problems in the prior art, and it is an object thereof to suppress rolling vibration in an engine caused by torque variation more effectively, and hence to suppress vehicle body vibration caused by the torque variation.

The present invention provides an engine vibration suppression device for an engine in which a rotating electrical machine is connected to an output shaft. The device comprises a controller connected to the rotating electrical machine which estimates an internal cylinder pressure of the engine on the basis of an operating condition of the engine; calculates a torque variation in the engine on the basis of the estimated internal cylinder pressure; calculates an opposite phase torque of the torque variation in the engine as a torque correction amount; calculates a torque command value of the rotating electrical machine by adding the torque correction amount to a basic torque value for driving the rotating electrical machine to rotate; and torque-controls the rotating electrical machine such that a torque of the rotating electrical machine is equal to the torque command value.

According to an aspect of the present invention, an engine vibration suppression method for an engine in which a rotating electrical machine is connected to an engine output shaft is also provided. The method comprises estimating an internal cylinder pressure of the engine on the basis of an operating condition of the engine; calculating a torque variation in the engine on the basis of the estimated internal cylinder pressure; calculating an opposite phase torque of the torque variation in the engine as a torque correction amount; calculating a torque command value of the rotating electrical machine by adding the torque correction amount to a basic torque value for driving the rotating electrical machine to rotate; and torque-controlling the rotating electrical machine such that a torque of the rotating electrical machine is equal to the torque command value.

The details as well as other features and advantages of this invention are set forth in the remainder of the specification and are shown in the accompanying drawings.

DESCRIPTION OF THE PREFERRED EMBODIMENTS

Embodiments of this invention will be described below with reference to the attached drawings.

First Embodiment

Figure 1:
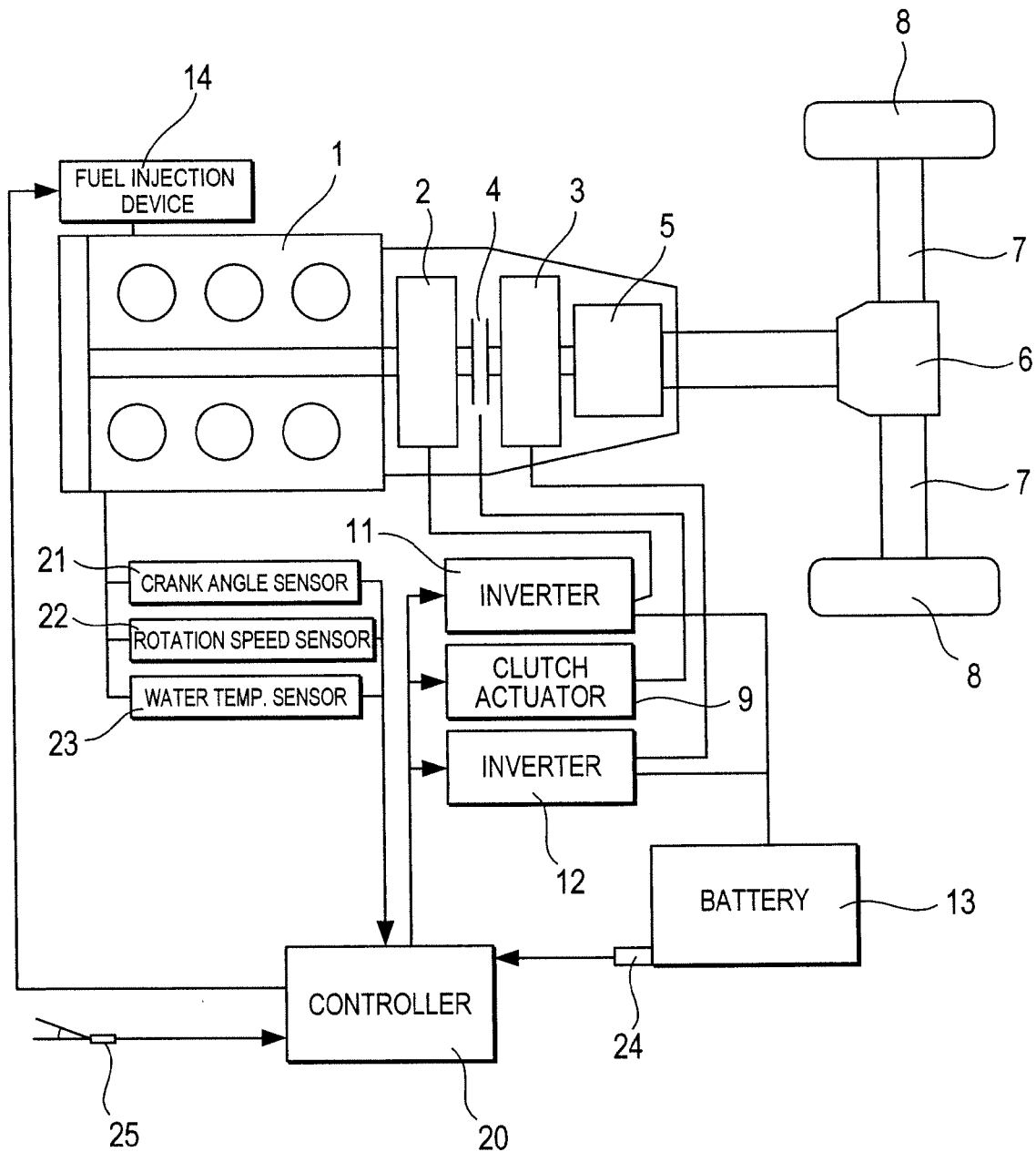
FIG. 1 is a schematic diagram of a hybrid vehicle according to a first embodiment.

FIG. 1 shows the schematic constitution of a hybrid vehicle to which this invention is applied. The vehicle is a hybrid vehicle in which the wheels are driven by two types of power source, namely a diesel engine 1 and motor generators (rotating electrical machines) 2, 3.

The motor generator 2 mainly performs power generation and startup of the engine 1, while the motor generator 3 provides the engine 1 with auxiliary power and performs regeneration during deceleration.

The engine 1 is a six-cylinder, four-cycle engine, and an output shaft thereof is connected to a rotor of the motor generator 2. An output shaft of the rotor of the motor generator 2 is connected to an input shaft of a clutch 4. An output shaft of the clutch 4 is connected to a rotor of the motor generator 3, an output shaft of the motor generator 3 is connected to an input shaft of a transmission 5, and an output shaft of the transmission 5 is connected to drive shafts 7 via a differential gear 6. Vehicle wheels 8 are connected to the drive shafts 7. It should be noted that here, the rotor of the motor generator 2 is connected directly to the output shaft of the engine 1, but may be connected via a power transmission element such as a gear or belt. Further, the clutch 4 is a friction disc clutch or an electromagnetic clutch, the engagement and release of which are controlled by a clutch actuator 9.

A power plant wherein the engine 1, motor generators 2, 3, and transmission 5 are joined is elastically supported on the vehicle body via an engine mount.

A battery 13 is connected to inverters 11, 12 that are connected respectively to the motor generators 2, 3. A three-phase coil of the motor generators 2, 3 is supplied with a drive current for obtaining the torque required at the time via the inverters 11, 12.

A controller 20 serving as a vehicle control center performs overall control of the engine 1, the clutch actuator 9, the inverters 11, 12, and a fuel injection device 14 which performs fuel injection in the engine 1.

A crank angle sensor 21 for detecting a crank angle (output shaft angle) θ of the engine 1, a rotation speed sensor 22 for detecting a rotation speed $N_e$ of the engine 1, and a water temperature sensor 23 for detecting a temperature $T_w$ of the cooling water of the engine 1 are attached to the engine 1 as sensors for detecting the operating conditions of the engine 1. Detection signals from each of the sensors are input into the controller 20 as needed.

In addition, detection signals from a charge state sensor 24 which detects a charge state C of the battery 13 and an accelerator sensor 25 for detecting an accelerator pedal position produced by a driver are input into the controller 20. An accelerator switch for detecting an accelerator operation is installed in the accelerator sensor 25.

On the basis of the detection signals from each of the sensors described above, the controller 20 outputs a fuel injection amount control signal to the fuel injection device 14 which performs fuel injection in relation to the engine 1. The controller 20 also outputs a field current control signal for controlling the output torque of the motor generators 2, 3 to the inverters 11, 12.

Here, rolling resonance, in which the engine main body vibrates rotationally about the output shaft with the engine mount supporting the engine 1 acting as a spring, exists in the engine 1. When the rotation basic order component (the rotation third order in the case of six cylinders), which is expressed as the (cylinder number/2) order of torque variation substantially matches the rolling resonance frequency, large rolling vibration is generated, and when this rolling vibration is transmitted to the vehicle body via the engine mount, large vehicle body vibration occurs.

Typically, to exclude the rolling resonance frequency from the normal driving region of the engine, the spring constant of the engine mount is set such that the rolling resonance frequency is lower than the rotation basic order of an idle rotation speed. However, during startup or stoppage of the engine 1, the rotation speed of the engine 1 varies between zero and the idle rotation speed, thereby passing through a rotation speed at which the rotation basic order component matches the rolling resonance frequency, and as a result, rolling vibration occurs in the engine 1, causing the vehicle body to vibrate.

Hence, the controller 20 uses the motor generator 2 to perform rolling vibration suppression control such as that described below.

During rolling vibration suppression control, considering the fact that torque variation occurs when the internal cylinder pressure is converted into torque, the internal cylinder pressure of the engine 1 is calculated, and on the basis of the calculated internal cylinder pressure, torque variation is calculated for each cylinder.

First, the method of calculating the internal cylinder pressure is described. In a four-cycle engine, during motoring such as startup (during non-combustion periods), the internal pressure of the cylinder is raised and lowered by compressing and expanding air as the engine rotates.

Figure 2:
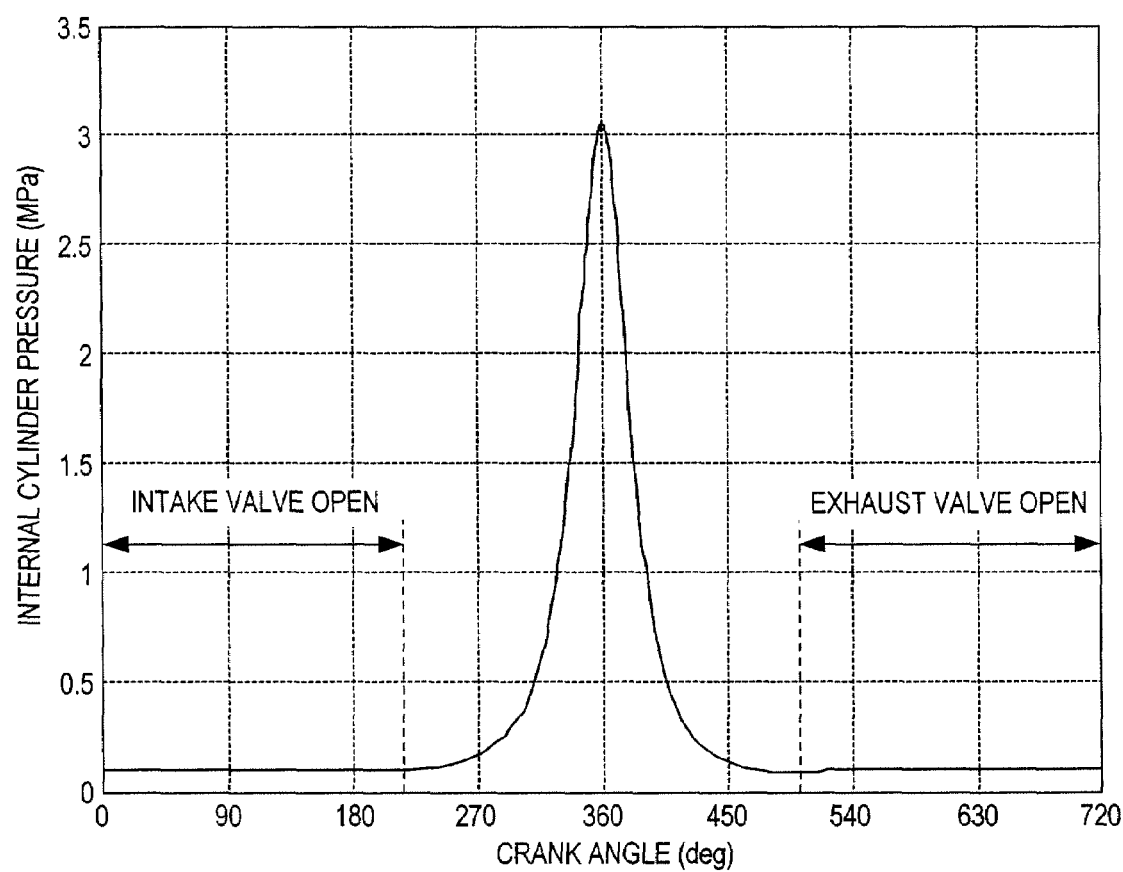
FIG. 2 is a diagram showing a relationship between a crank angle and an internal cylinder pressure of an engine.

More specifically, when an intake valve is opened with the crank angle θ in the vicinity of zero degrees (exhaust top dead center), as shown in FIG. 2, air is taken in as the piston falls, and at this time, the internal cylinder pressure is substantially equal to the internal pressure of an intake pipe (intake stroke). When θ=180 degrees is exceeded and the intake valve is closed, the air is compressed as the piston rises, leading to a sudden increase in the internal cylinder pressure (compression stroke). When compression top dead center is reached at θ=360 degrees, the internal cylinder pressure reaches a maximum value, and thereafter, the internal cylinder pressure falls as the piston falls (expansion stroke). When an exhaust valve is opened slightly before θ=540 degrees, the air in the cylinder is discharged to an exhaust pipe as the piston rises, and hence the internal cylinder pressure becomes substantially equal to the pressure in the exhaust pipe (exhaust stroke). Then, in the vicinity of θ=720 degrees=zero degrees, the exhaust valve closes. When discharge is complete, the intake valve opens and the intake stroke begins again.

Hence, an internal cylinder pressure P in the intake stroke can be determined by detecting the pressure in the intake pipe, and the internal cylinder pressure P in the exhaust stroke can be determined by detecting the pressure in the exhaust pipe. As regards the pressure in the intake pipe, in a diesel engine intake air is not usually throttled by a throttle and the diesel engine of this embodiment is naturally aspirated, so the intake air pressure may be set to one atmosphere at all times without being detecting. Likewise, the pressure in the exhaust pipe is substantially constant at one atmosphere, and may therefore be set at one atmosphere without being detected.

The internal cylinder pressure P in the compression/expansion stroke may be determined using the fact that when a polytrope index is set at γ, the relationship of the following Equation (1) is established between an internal cylinder volume V and the internal cylinder pressure P.

$$PV^\gamma = \text{constant} \quad (1)$$

In other words, the internal cylinder volume V may be determined from the crank angle θ, and hence the internal cylinder pressure P of the compression/expansion stroke may be determined from an internal cylinder volume $V_0$ and an internal cylinder pressure $P_0$ at the start of compression using the following Equation (2).

$$P = P_0 \left(\frac{V_0}{V}\right)^\gamma \quad (2)$$

The compression start time is usually set as the closing timing of the intake valve, but when the piston begins to rotate in the middle of the compression stroke during engine startup, compression begins at the rotation start time. The reason for this is that when the engine 1 stops, the internal cylinder pressure falls to the pressure in the intake pipe or the pressure in the exhaust pipe, and compression resumes from this state. Furthermore, the engine 1 of this embodiment does not have a variable valve mechanism, and the intake valve opening and closing timings are fixed in relation to the crank angle θ. Therefore, the intake valve opening and closing timings can be determined from the crank angle θ.

The polytrope index γ takes a substantially constant value during a normal operation and so on, but when the rotation speed varies during startup or the like, the polytrope index γ takes a larger value as the rotation speed increases. The reason for this is that the time required for compression and expansion decreases as the rotation speed increases, and therefore the amount of heat which escapes to the outside through the cylinder wall and so on decreases. Likewise with regard to the engine temperature, which is represented by the engine water temperature, the amount of heat which escapes to the outside decreases as the engine temperature rises, and hence the polytrope index γ decreases. Therefore, in this embodiment a map relating the polytrope index γ to the engine rotation speed and the engine water temperature is prepared in advance, and the polytrope index γ is calculated by referring to this map.

The internal cylinder volume V may also be calculated sequentially in relation to the crank angle θ, but in this embodiment, to reduce the calculation load of the controller 20, a table relating the pre-calculated internal cylinder volume V to the crank angle θ is prepared in advance and the internal cylinder volume V is calculated by referring to this table.

The torque relative to the internal cylinder pressure P may be determined by multiplying a coefficient α, which is determined from the geometrical shape of the crank and a connecting rod at the crank angle θ, by the internal cylinder pressure P. Similarly to the internal cylinder volume V, to reduce the calculation load of the controller 20, a table relating the pre-calculated coefficient α to the crank angle θ is prepared in advance and the coefficient α is calculated by referring to this table.

Hence, by determining the amount of variation in the internal cylinder pressure P from the internal cylinder pressure P determined using Equation (2), and multiplying the amount of variation by the coefficient α, the torque variation in a certain cylinder of the engine 1 can be calculated. By calculating the torque variation for each cylinder and adding the calculation results together, the torque variation in the engine 1 can be calculated.

Figure 3:
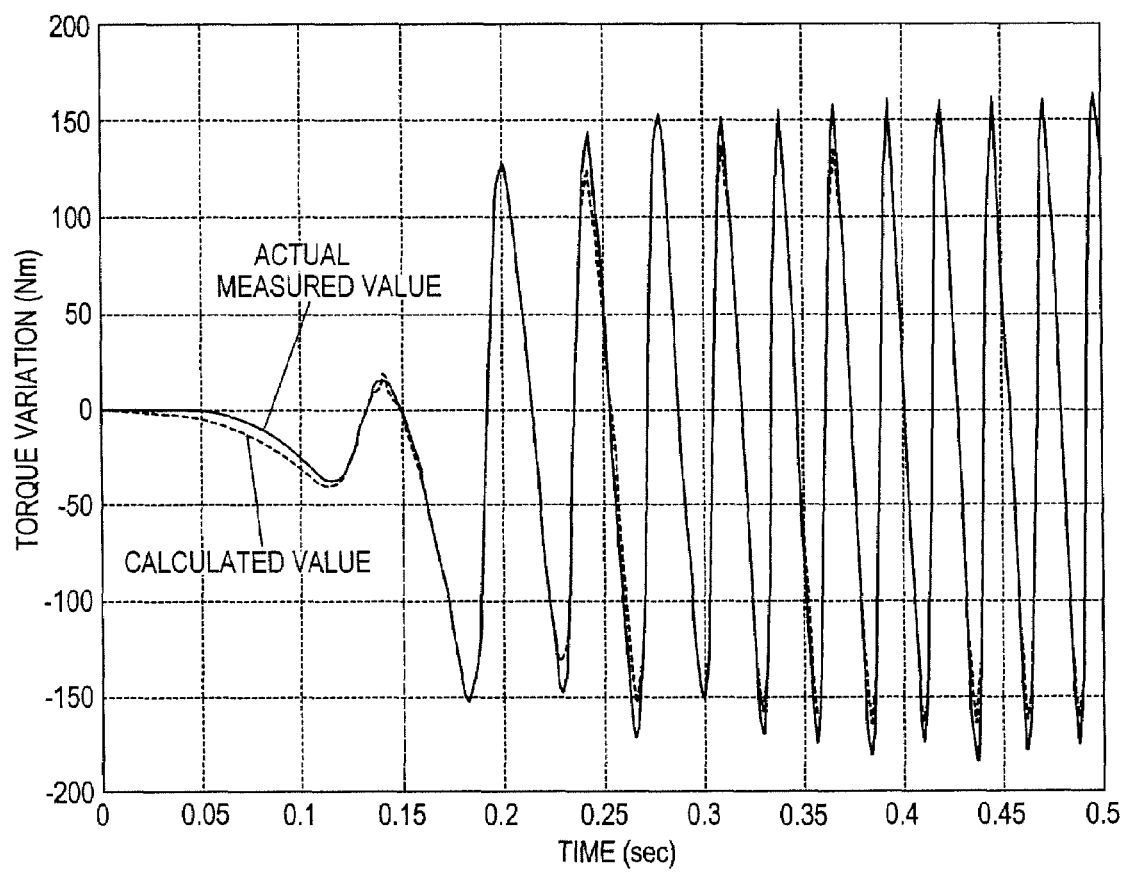
FIG. 3 is a diagram contrasting an actual measured value and a calculated value of engine torque variation.

FIG. 3 shows an actual measured value of the torque variation in the engine 1 and a calculated value of the torque variation determined using the calculation method described above. The calculated values substantially match the actual measured values, and hence according to the calculation method described above, the torque variation in the engine 1 can be calculated with a high degree of precision.

Once the torque variation in the engine 1 has been calculated in this manner, the torque variation is multiplied by −1 to obtain an opposite phase thereof, and this is set as a torque correction amount of the motor generator 2. A basic torque value $T_0$ required to drive the motor generator 2 to rotate is then added to the torque correction amount, and the result is set as a torque command value T, which is used to control the torque of the motor generator 2. As a result, the torque variation in the engine 1 is canceled out, and increases in rolling vibration during startup and stoppage can be prevented.

Figure 4:
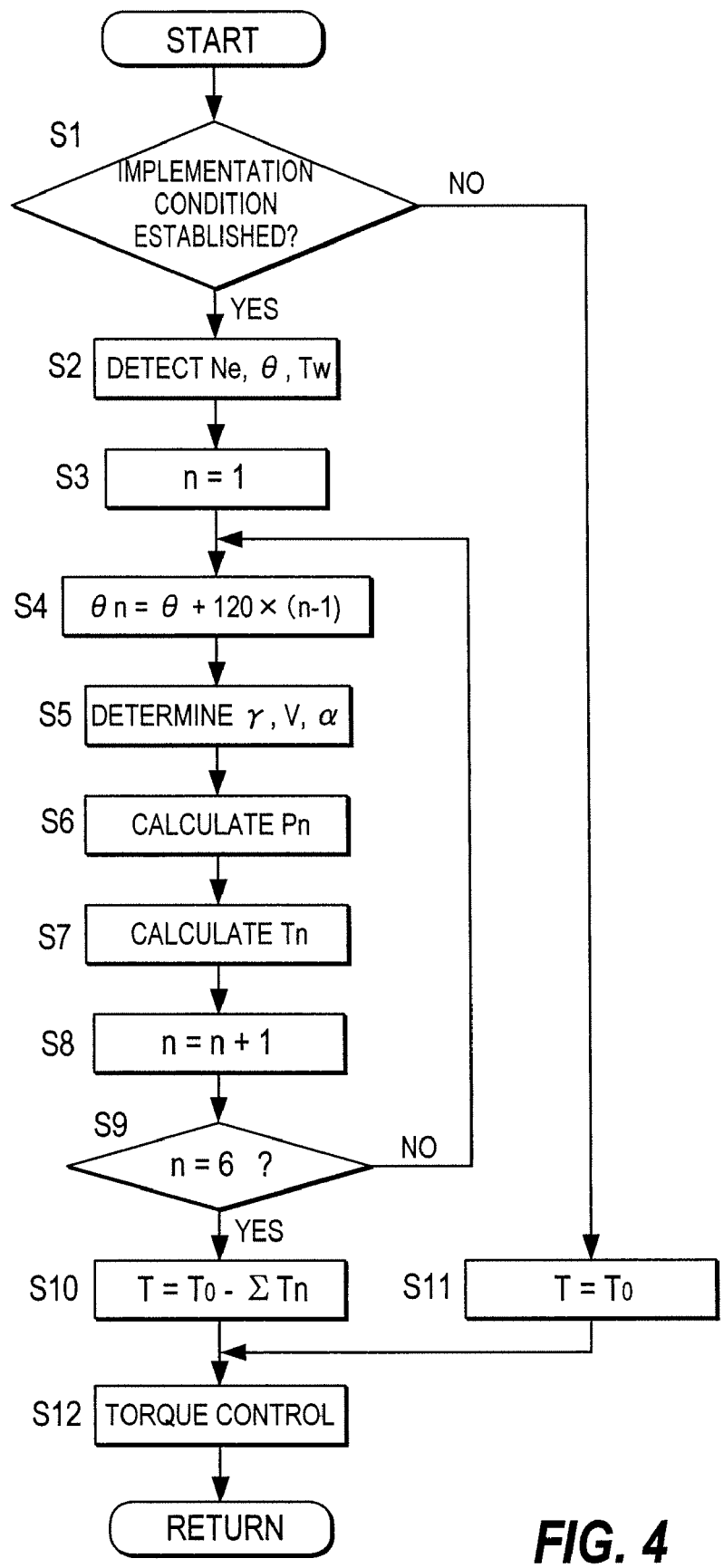
FIG. 4 is a flowchart showing the content of rolling vibration suppression control performed by a controller in the first embodiment.

FIG. 4 shows the content of the rolling vibration suppression control of the engine 1 that is executed by the controller 20. This flow is executed repeatedly by the controller 20 at predetermined time intervals (of 10 msec, for example).

First, in a step S1, a determination is made as to whether or not implementation conditions for rolling vibration suppression control have been established. The implementation conditions are established when the rotation speed $N_e$ of the engine 1 is larger than 0 rpm and fuel injection is not underway in the engine 1, for example. A condition whereby the rotation speed $N_e$ of the engine 1 is no greater than a predetermined rotation speed (800 rpm, for example) may be used instead of the condition that fuel injection is not underway.

When the conditions are established, the flow advances to a step S2 onward, and when the conditions are not established, the flow advances to a step S11, where the basic torque value $T_0$ for driving the motor generator 2 to rotate is set without modification as the torque command value T of the motor generator 2.

In the step S2, the rotation speed $N_e$, crank angle θ, and cooling water temperature $T_w$ of the engine 1, which are required for the rolling vibration suppression control, are detected. Here, the crank angle θ is detected with exhaust top dead center of the first cylinder set at zero degrees.

In steps S3 to S9, torque variation $T_1$ to $T_6$ in each cylinder is calculated. First, to calculate the torque variation $T_1$ of the first cylinder, a parameter n expressing the cylinder number is set to 1 in step S3.

In the step S4, a crank angle $\theta_1$ of the first cylinder is calculated. A crank angle $\theta_n$ of an $n^{th}$ cylinder may be calculated using the following Equation (3).

$$\theta_n = \theta + 120 \times (n-1) \qquad (3)$$

Accordingly, the crank angle $\theta_1$ of the first cylinder may be calculated by inserting n=1 into Equation (3).

Next, in the step S5, the polytrope index γ is determined on the basis of the detected water temperature $T_w$, and rotation speed $N_e$ of the engine 1 by referring to the map. Further, the cylinder volume V and the coefficient α are determined on the basis of the crank angle θ by referring to the table. The map and table are determined in advance through calculation, experiment, and so on, and stored in memory within the controller 20.

In the step S6, an internal cylinder pressure $P_1$ is calculated from these values, and in the step S7, the coefficient α is multiplied by the amount of variation in the internal cylinder pressure $P_1$ to calculate the torque variation $T_1$ of the first cylinder.

In the step S8, the parameter n is incremented, and in the step S9, a determination is made as to whether or not the parameter n has exceeded 6. If not, the flow returns to the step S4, where the torque variation of the next cylinder is calculated.

By repeating the processing of the steps S4 to S9 up to the sixth cylinder, the torque variations $T_1$ to $T_6$ of all of the cylinders are determined, and a sum total $\Sigma T_n$, of the determined torque variations $T_1$ to $T_6$ is calculated as the torque variation in the engine 1.

In a step S10, a value obtained by subtracting the torque variation $\Sigma T_n$ of the engine 1 from the basic torque value $T_0$ for driving the motor generator 2 to rotate is set as the torque command value T for the motor generator 2.

In a step S12, the torque command value T set in the step S10 or S11 is transmitted to the inverter 11. The inverter 11 supplies the motor generator 2 with a field current for generating torque corresponding to the torque command value T, and thus the torque of the motor generator 2 is controlled.

Figure 5:
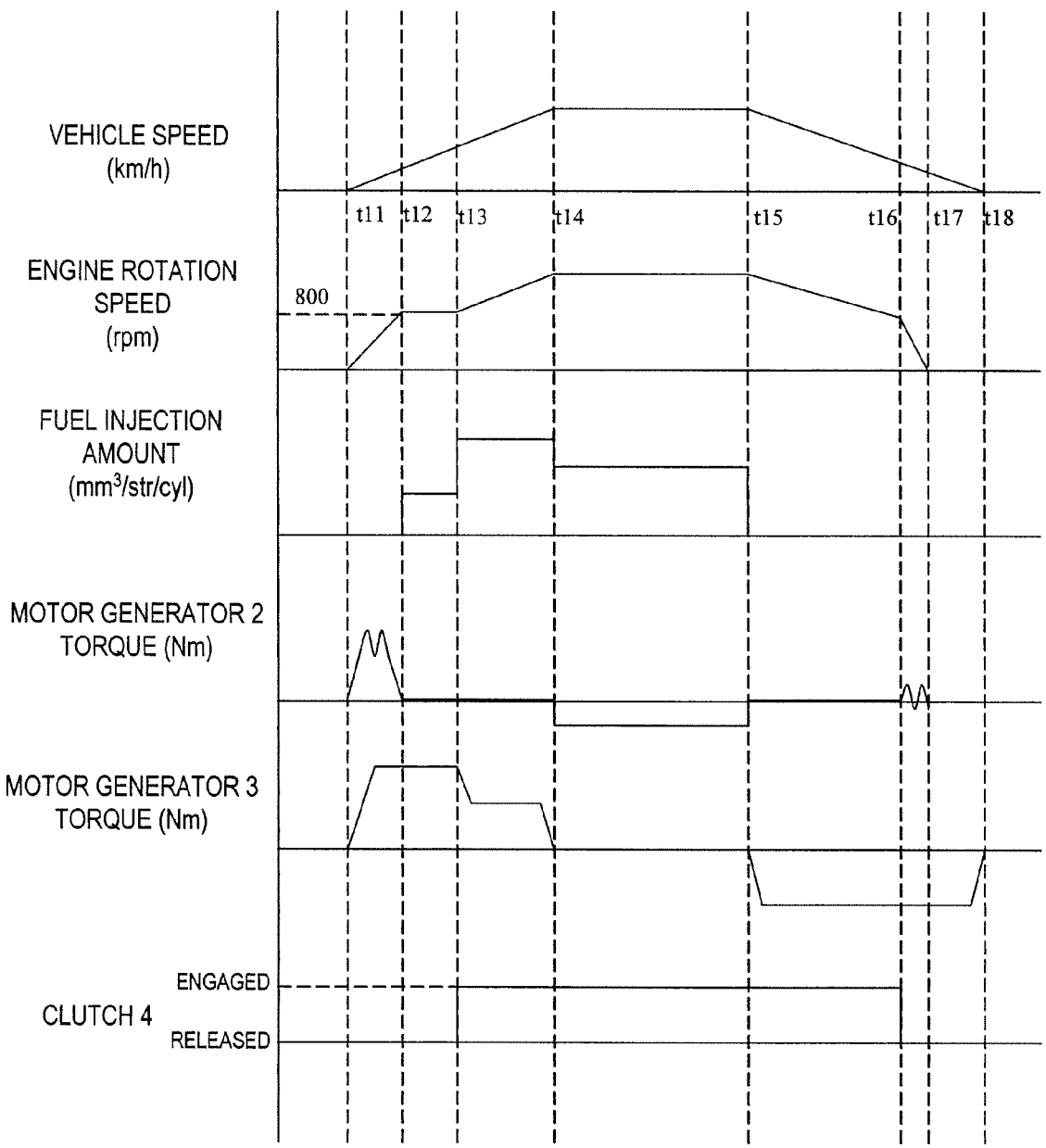
FIG. 5 is a time chart illustrating the actions and effects of the first embodiment

FIG. 5 is a time chart showing a process starting when the vehicle begins to move from a stationary state and ending when the vehicle stops again. It is assumed that prior to a time ti1, the vehicle is in a stationary state with the engine 1 halted and the clutch 4 released.

At the time $t_{11}$, the accelerator pedal is depressed and the accelerator switch switches ON. Accordingly, the engine 1 is driven to rotate by the motor generator 2 so that the engine 1 is started. As a result, the rotation speeds of the engine 1 and the motor generator 2 increase.

At the same time, a torque command value for the motor generator 3 is calculated on the basis of the accelerator pedal position, and the motor generator 3 is caused to generate torque corresponding to the torque command value. As a result, the vehicle is driven and the vehicle speed gradually rises.

Between the time $t_{11}$ and a time $t_{12}$, the rotation speed of the engine 1 is no greater than 800 rpm and fuel injection is not underway, and therefore the implementation conditions for rolling vibration suppression control are established. Hence, rolling vibration suppression control is performed. More specifically, by calculating torque variation generated in the engine output shaft when the engine 1 is in a motoring state, and adding a torque correction amount corresponding to the opposite phase of the torque variation to the basic torque value $T_0$ for driving the motor generator 2 to rotate, the torque command value T relating to the motor generator 2 is corrected, and thus the torque of the motor generator 2 is controlled.

When the rotation speed $N_e$ of the engine 1 reaches a predetermined value (800 rpm, for example) at the time $t_{12}$, fuel injection from an injector begins. When fuel injection begins, the implementation conditions for rolling vibration suppression control are no longer established, and therefore rolling vibration suppression control is stopped.

At a time $t_{13}$, the clutch 4 is engaged, and from the time $t_{13}$ to a time $t_{14}$, the vehicle is accelerated using the output of both the engine 1 and the motor generator 3. From the time $t_{14}$ to a time $t_{15}$, the vehicle travels at a constant speed. At this time, the engine 1 is driven in a high efficiency region and power generation is performed by the motor generator 2 in order to store surplus energy in the battery 13.

When the accelerator switch switches OFF at the time $t_{15}$, fuel injection is halted, regeneration torque is generated from the motor generator 3, the vehicle decelerates, and the deceleration energy produced thereby is charged to the battery 13 as electrical energy.

When the vehicle speed falls to a predetermined value (10 km/h, for example) at a time $t_{16}$, the clutch 4 is released. At a time $t_{17}$, the engine 1 is stopped, and at a time $t_{18}$, the vehicle stops.

From the time $t_{16}$ to the time $t_{17}$, the engine rotation speed is no greater than 800 rpm and fuel injection is not underway. Therefore, the implementation conditions for rolling vibration suppression control are established, and similarly to the period extending from the time $t_{11}$ to the time $t_{12}$, rolling vibration suppression control is performed using the motor generator 2.

Figure 6:
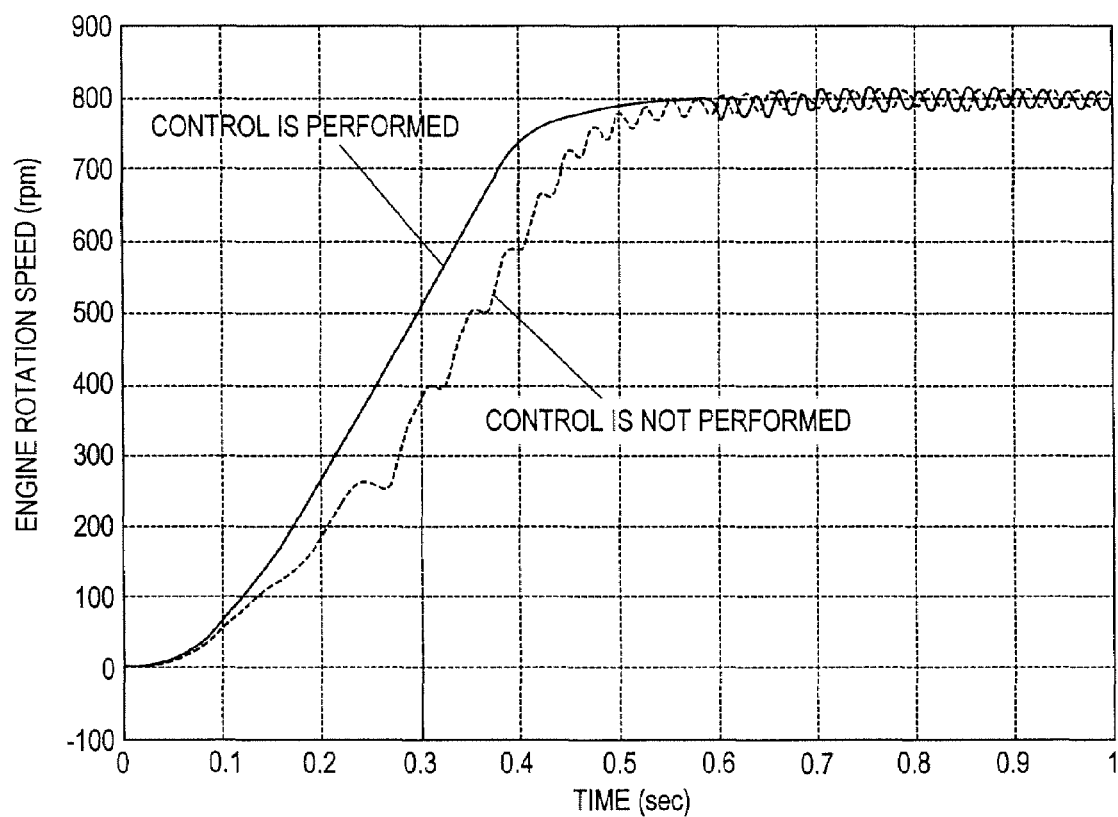
FIG. 6 is a diagram showing the manner in which an engine rotation speed changes during engine startup.
Figure 7:
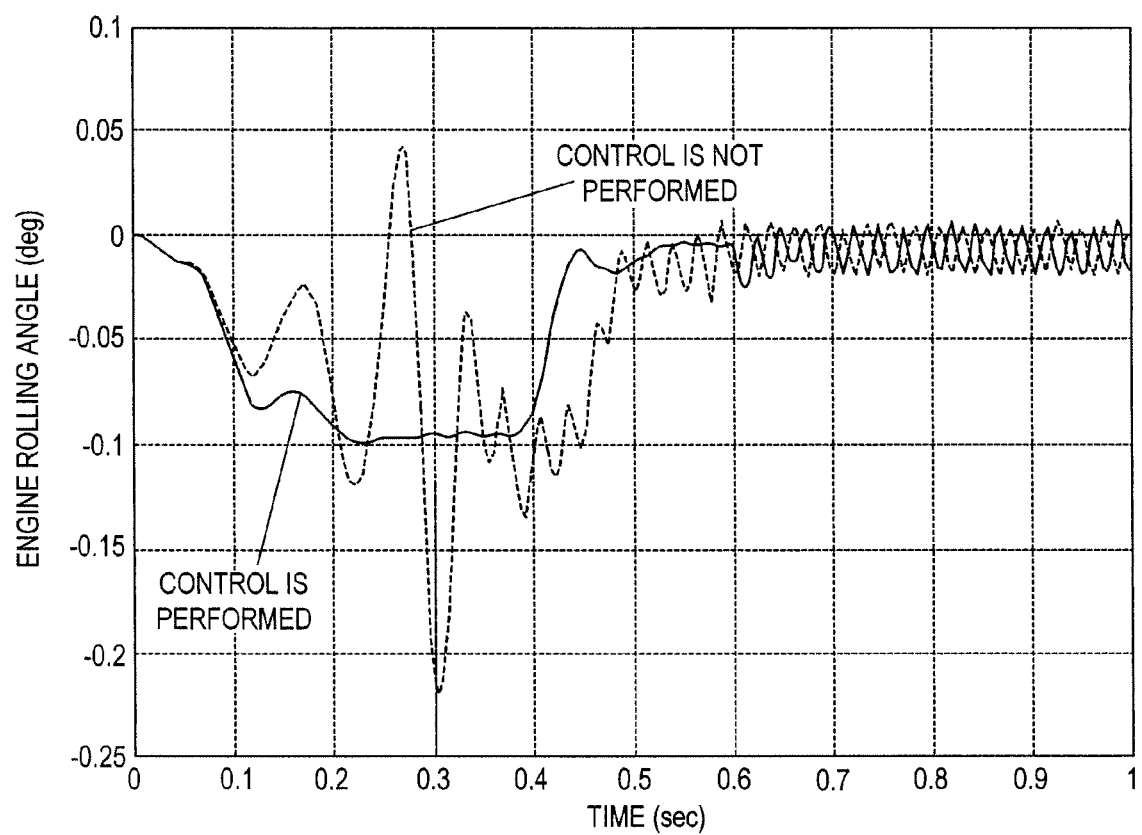
FIG. 7 is a diagram showing the manner in which an engine rolling angle changes during engine startup.

FIGS. 6 and 7 show the manner in which the rotation speed and rolling angle of the engine 1 vary during engine startup. When rolling vibration suppression control is not performed, the rolling angle of the engine 1 varies greatly during startup due to the torque variation in the engine 1, but when rolling vibration suppression control is performed, variation in the rolling angle is suppressed in comparison with a case in which the control is not performed, and moreover, the engine rotation speed rises smoothly and speedily, enabling a reduction in startup time.

Figure 8:
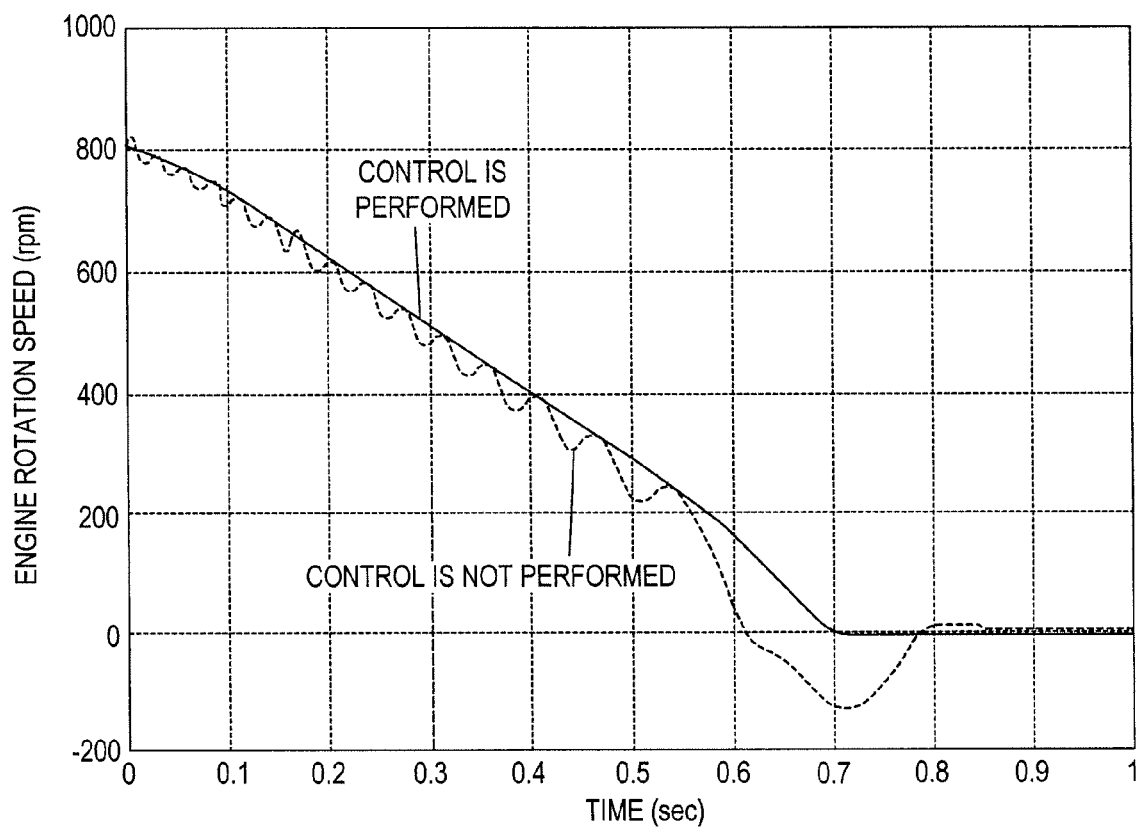
FIG. 8 is a diagram showing the manner in which the engine rotation speed changes during engine stoppage.
Figure 9:
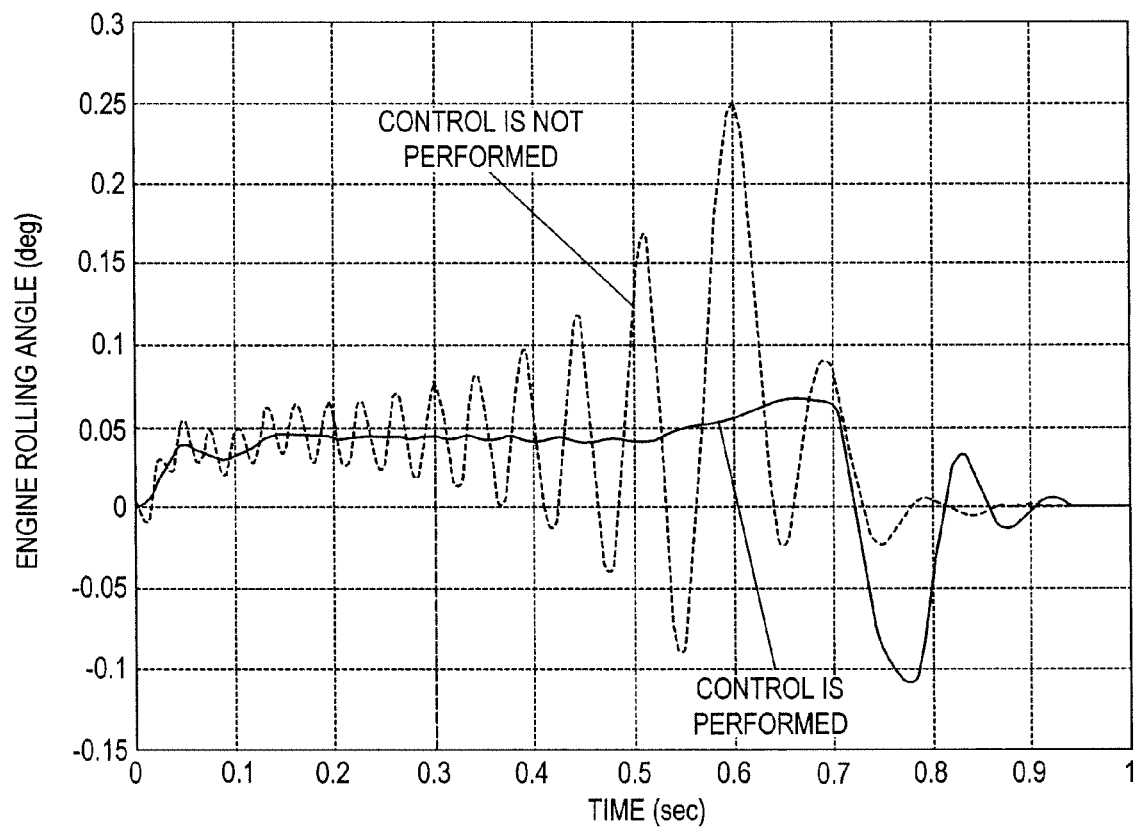
FIG. 9 is a diagram showing the manner in which the engine rolling angle changes during engine stoppage.

FIGS. 8 and 9 show the manner in which the rotation speed and rolling angle of the engine 1 vary when the engine stops. Similarly to startup, when rolling vibration suppression control is not performed, the rolling angle varies greatly immediately before the engine 1 stops, but by performing rolling vibration suppression control, variation in the rolling angle can be greatly suppressed and the engine 1 can be stopped without producing vehicle body vibration.

The actions and effects of the first embodiment will now be summarized.

In the first embodiment, the internal cylinder pressure of the engine 1 is estimated based on the operating conditions of the engine 1, the torque variation in the engine 1 is calculated on the basis of the estimated internal cylinder pressure, and an opposite phase torque of the torque variation in the engine 1 is calculated as the torque correction amount. The torque command value T of the motor generator 2 is then calculated by adding the torque correction amount to the basic torque value $T_0$ for driving the motor generator 2 to rotate, and torque control is performed such that the torque of the motor generator 2 equals the torque command value T. As a result, the torque variation in the engine 1 is canceled out by the torque correction amount of the motor generator 2, and vehicle body vibration caused by torque variation can be suppressed.

The internal cylinder pressure of the engine 1 is calculated on the basis of the crank angle and intake air pressure of the engine 1, and the compression start timing of the compression stroke. More specifically, the internal cylinder pressure in the compression/expansion stroke is calculated on the basis of the crank angle of the engine 1 and the intake air pressure at the compression start timing of the compression stroke. In so doing, the internal cylinder pressure of the engine 1 at the time of startup can be calculated with a high degree of precision, and the torque variation in the engine 1 can be calculated accurately.

Usually, the compression start time is set as the closing timing of the intake valve, but when rotation begins from a midway point in the compression stroke during startup, the rotation start time may be set as the compression start time, and in so doing, the internal cylinder pressure of the engine 1 at the time of startup can be estimated with an even higher degree of precision.

Moreover, the internal cylinder pressure is corrected on the basis of at least one of the temperature and rotation speed of the engine 1. More specifically, by correcting the polytrope index γ in accordance with the temperature and rotation speed of the engine 1, the internal cylinder pressure of the engine 1, and therefore the torque variation in the engine 1, can be calculated even more accurately.

Furthermore, the torque command value is calculated by adding the torque correction amount to the basic torque value when the rotation speed of the engine 1 is lower than a predetermined rotation speed, and therefore torque variation can be suppressed when the effect of torque variation accompanying compression and expansion within the cylinder is great.

Moreover, the torque command value T is calculated by adding the torque correction amount to the basic torque value $T_0$ when combustion is not underway in the engine 1, or in other words when the internal cylinder pressure is fixed in accordance with the compression and expansion in the cylinder and can therefore be determined accurately, and hence the torque variation can be suppressed with a high degree of precision.

Second Embodiment

Figure 10:
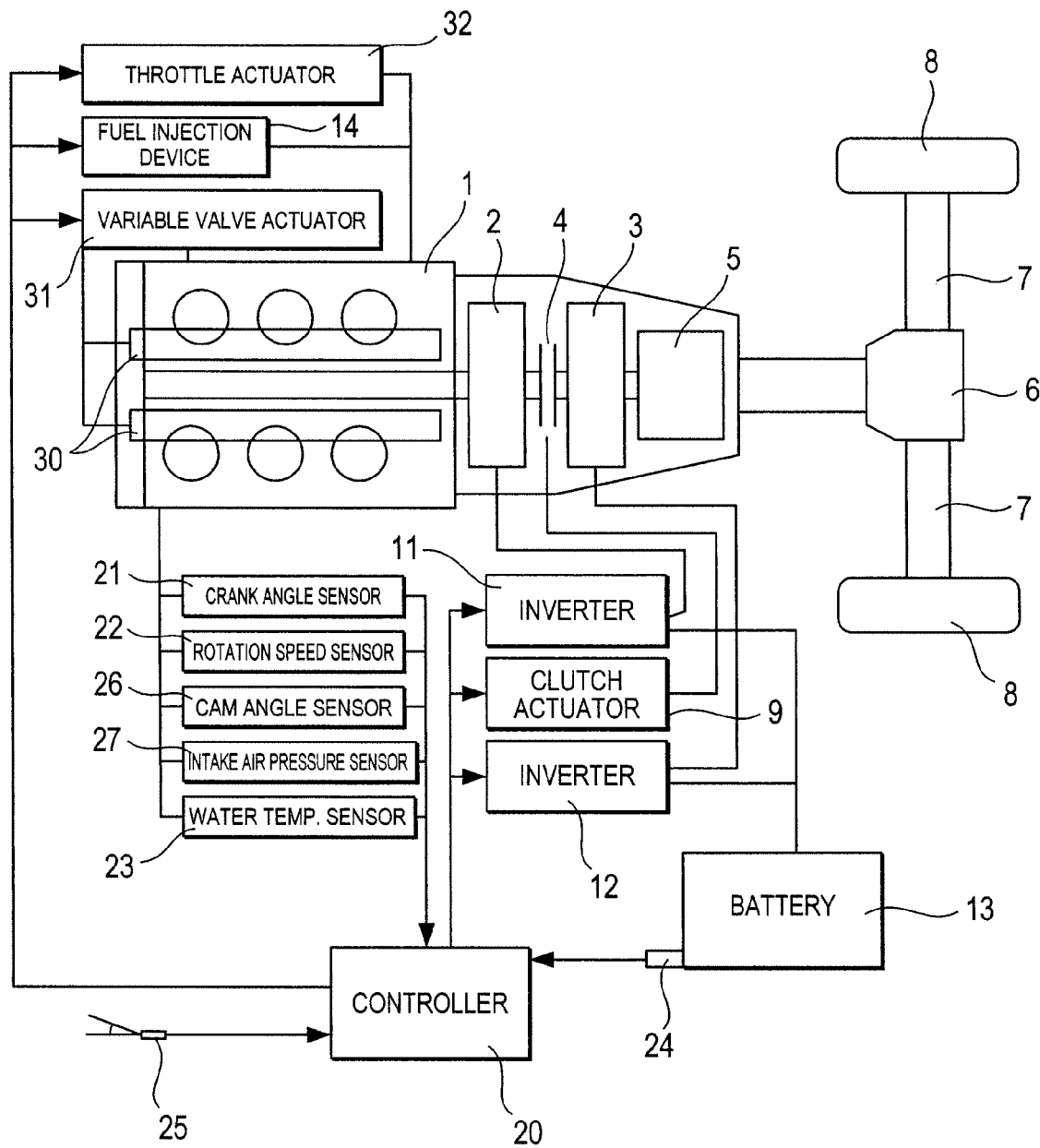
FIG. 10 is a schematic diagram of a hybrid vehicle according to a second embodiment.

FIG. 10 shows the schematic constitution of a hybrid vehicle according to a second embodiment. Identical constitutions to those of the first embodiment have been allocated identical reference symbols, and where appropriate, description thereof has been omitted.

In the second embodiment, the motor generator 2 has a lower output than that of the first embodiment to achieve reductions in size and weight. Moreover, a decompression mechanism is provided to improve fuel economy and reduce torque variation by retarding the phase angle of the intake valve during engine startup so that the actual compression ratio is reduced, and therefore the torque variation in the engine 1 is reduced.

Furthermore, to purify a catalyst device for the purpose of exhaust gas purification, a throttle valve (not shown) is disposed in the intake system for performing control to raise the exhaust gas temperature by controlling an air-fuel ratio to a rich side when the catalyst has deteriorated. The opening of the throttle valve is modified by a throttle actuator 32.

The decompression mechanism reduces the torque variation by having a variable valve actuator 31 turn an intake camshaft 30 relative to a basic angle in order to change the phase angle of the intake valve, and by closing the intake valve, which is normally closed at the initial stage of the compression stroke, at the intermediate stage of the compression stroke during startup so that the air compression amount during the compression stroke decreases.

During startup, the rotation speed of the engine 1 passes through a resonance point of the engine mount, and therefore the decompression mechanism is used to retard the phase angle of the intake valve and reduce the torque variation. When the rotation speed of the engine 1 passes through the resonance point to reach a predetermined rotation speed, the motor generator 2 maintains the rotation speed of the engine 1 at a constant speed and returns the retarded phase angle of the intake valve to the advance side. When the internal cylinder pressure has risen sufficiently to enable combustion, fuel injection is commenced, whereby combustion in the engine 1 begins.

Hence in the second embodiment, torque variation during startup is reduced by the decompression mechanism. However, the decompression mechanism does not reduce large torque variation in the engine 1 sufficiently, and therefore, similarly to the first embodiment, rolling vibration suppression control is also employed during startup.

During rolling vibration suppression control, similarly to the first embodiment, the rotation speed $N_e$, crank angle θ, and engine water temperature $T_w$ of the engine 1 are detected. However, the phase angle of the intake valve is changed by the decompression mechanism, and in order to specify the timing at which compression is started by closing the intake valve, a cam angle sensor 26 is attached to the intake camshaft and a cam angle $\theta_C$ is detected thereby. The cam angle sensor 26 generates a pulse when the intake valve of each cylinder is closed.

Moreover, in the second embodiment the intake air may be throttled by a throttle as described above, and therefore the intake air pressure is not always fixed at one atmosphere. Hence, the intake air pressure is detected by an intake air pressure sensor 27.

In a similar manner to the first embodiment, the controller 20 calculates the torque variation in the engine 1 on the basis of these detected values and performs torque control on the motor generator 2 in accordance with the calculated torque variation. However, in the second embodiment the output of the motor generator 2 is small, as noted above, and hence if the same method as that of the first embodiment is employed, the torque command value T may exceed a maximum torque value $T_{max}$ that can be generated by the motor generator 2.

When the torque command value T exceeds the maximum torque value $T_{max}$ that can be generated, the motor generator 2 is unable to generate torque corresponding to the torque command value T, and as a result, the average value of the torque generated by the motor generator 2 falls below the basic torque, making it impossible to obtain the desired rotation increase speed and causing an increase in the startup time.

Hence in the second embodiment, to ensure that the torque command value does not exceed the maximum torque value $T_{max}$ that can be generated by the motor generator 2, the opposite phase of a value obtained by multiplying a correction coefficient K by the torque variation is set as the torque correction amount (maximum torque correction). The correction coefficient K is determined in the following manner.

As regards the torque following closure of the intake valve, the internal cylinder pressure may be determined using Equation (2), and by determining $P_0$, $V_0$ at the time of intake valve closure, the torque variation accompanying the subsequent expansion and compression can be calculated. Therefore, the torque variation at 60 degrees before and after top dead center, at which the maximum value and minimum value of the torque variation occur, is calculated and the maximum value and minimum value thereof are determined. Differences obtained by subtracting the maximum value and minimum value from the basic torque value $T_0$ become the maximum value and minimum value of the torque command value for canceling out the torque variation, and when an absolute value $|Ta0|$ of either the maximum value or the minimum value exceeds the maximum torque value $T_{max}$ that can be generated by the motor generator 2, the correction coefficient K is determined using the following Equation (4).

$$K = \frac{T_{max} - T_0}{|T_{a0}|} \quad (4)$$

A value obtained by multiplying the correction coefficient K by the subsequently calculated torque variation and multiplying the result thereof by −1 is then calculated as the torque correction amount T. In so doing, the torque command value T can be calculated so as to never exceed the maximum torque value $T_{max}$ that can be generated.

Here, the maximum torque value $T_{max}$ that can be generated is determined taking not only the maximum torque (rated torque) of the motor generator 2 into consideration, but also the charge state C of the battery 13 at that time. More specifically, when the battery 13 is charged sufficiently, torque is generated up to the maximum torque of the motor generator 2, but when the charge state C of the battery 13 falls below a predetermined value (60% or less, for example) so that the power of the battery 13 must be conserved, the value of the maximum torque value $T_{max}$ that can be generated decreases in accordance with the charge state C of the battery 13.

Further, to prevent a step from occurring in the torque command value T (the torque of the motor generator 2) when switching the correction coefficient K, the correction coefficient K is switched when the torque variation in the engine 1 is zero, and particularly when the torque variation switches from a positive value to a negative value.

Figure 11:
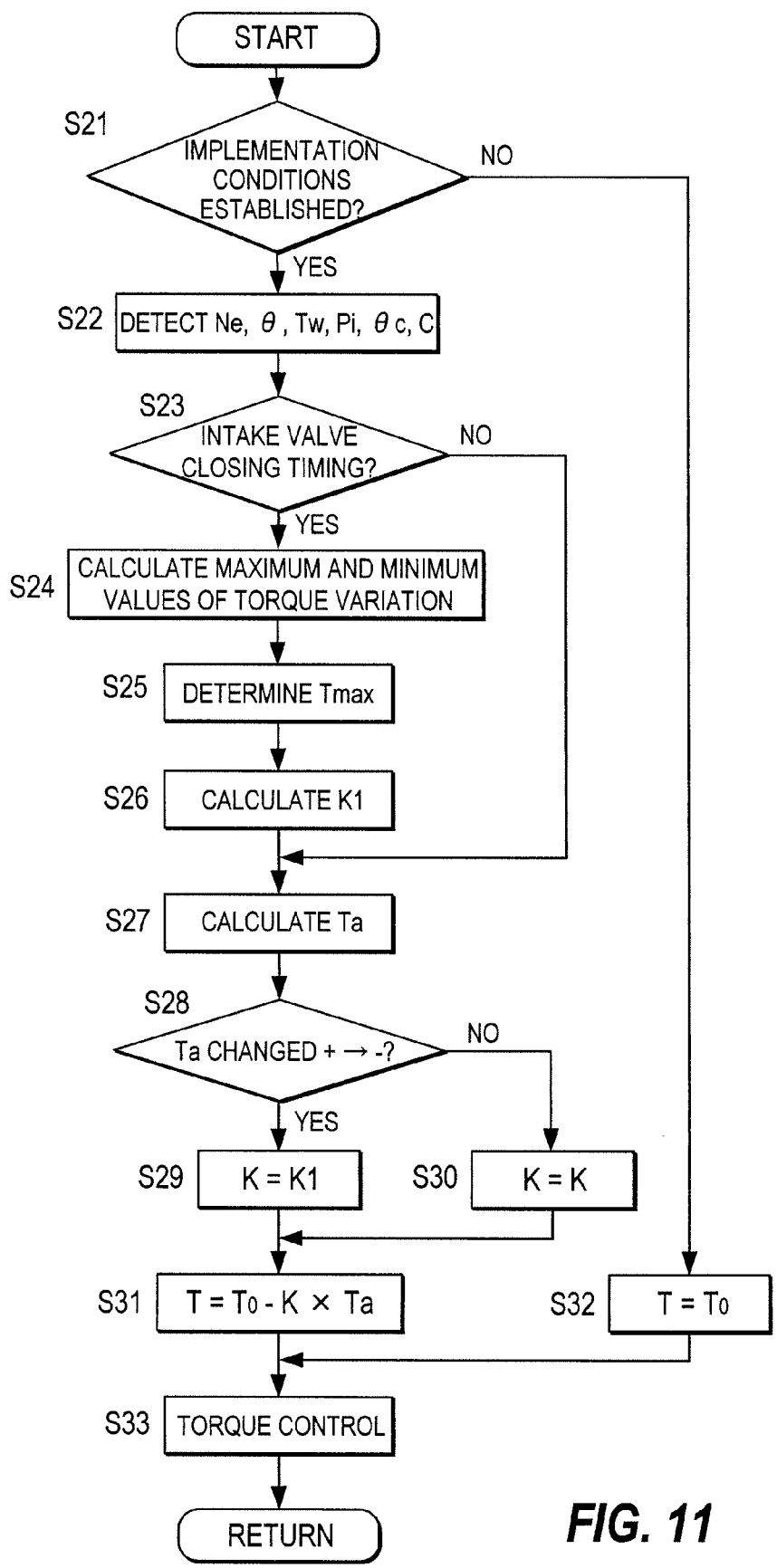
FIG. 11 is a flowchart showing the content of rolling vibration suppression control performed by a controller in the second embodiment.

FIG. 11 shows the content of rolling vibration suppression control of the engine 1 executed by the controller 20. This flow is executed repeatedly by the controller 20 at predetermined time intervals (of 10 msec, for example).

First, in a step S21, a determination is made as to whether or not implementation conditions for rolling vibration suppression control have been established. The implementation conditions are determined to have been established when the rotation speed $N_e$ of the engine 1 is no less than 0 rpm and no more than 800 rpm, for example. A condition according to which fuel injection is not underway in the engine 1 may be used instead of the condition that the rotation speed $N_e$ of the engine 1 is no greater than 800 rpm.

When the conditions are established, the flow advances to a step S22 onward, and when the conditions are not established, the flow advances to a step S32, where the basic torque value $T_0$ for driving the motor generator 2 to rotate is set without modification as the torque command value T of the motor generator 2.

In the step S22, the rotation speed $N_e$, crank angle $\theta$, cooling water temperature $T_w$, intake air pressure $P_i$ and cam angle $\theta_C$ of the engine 1, and charge state C of the battery 13, which are required for the rolling vibration suppression control, are detected. The crank angle $\theta$ is detected with exhaust top dead center of the first cylinder set at zero degrees.

In a step S23, a determination is made from the cam angle $\theta_C$ as to whether or not the intake valve closing timing has arrived. If the determination result is negative, the flow advances to a step S27. If the intake valve closing timing has arrived, the flow advances to a step S24, where the maximum value and minimum value of the torque variation in the engine 1 are calculated.

In a step S25, the maximum torque value $T_{max}$ that can be generated by the motor generator 2 is determined from the battery charge state C, and in a step S26, the correction coefficient K is calculated from the maximum torque value $T_{max}$ that can be generated and the basic torque value $T_0$ using Equation (3). The calculated correction coefficient is set as $K_1$.

In the step S27, torque variation $T_a$ of the engine 1 is calculated. The torque variation $T_a$ of the engine 1 is calculated using a similar process to that of the steps S13 to S19 in the first embodiment, i.e. by calculating the torque variation for each cylinder on the basis of variation in the internal cylinder pressure, and adding the obtained results together.

In a step S28, a determination is made as to whether or not the torque variation $T_a$ is zero on the basis of whether its sign has switched from positive to negative. If the torque variation $T_a$ is zero, the correction coefficient K is updated to $K_1$ calculated in the step S26, and if not, the correction coefficient K is not updated.

In a step S31, the torque command value T of the motor generator 2 is calculated using the correction coefficient K by means of the following Equation (5).

$$T = T_0 - K \times T_a \quad (5)$$

In the step S32, the torque command value T calculated in the step S31 or S32 is transmitted to the inverter 11. The inverter 11 supplies the motor generator 2 with a field current for generating torque corresponding to the torque command value T, and thus the torque of the motor generator 2 is controlled.

Figure 12:
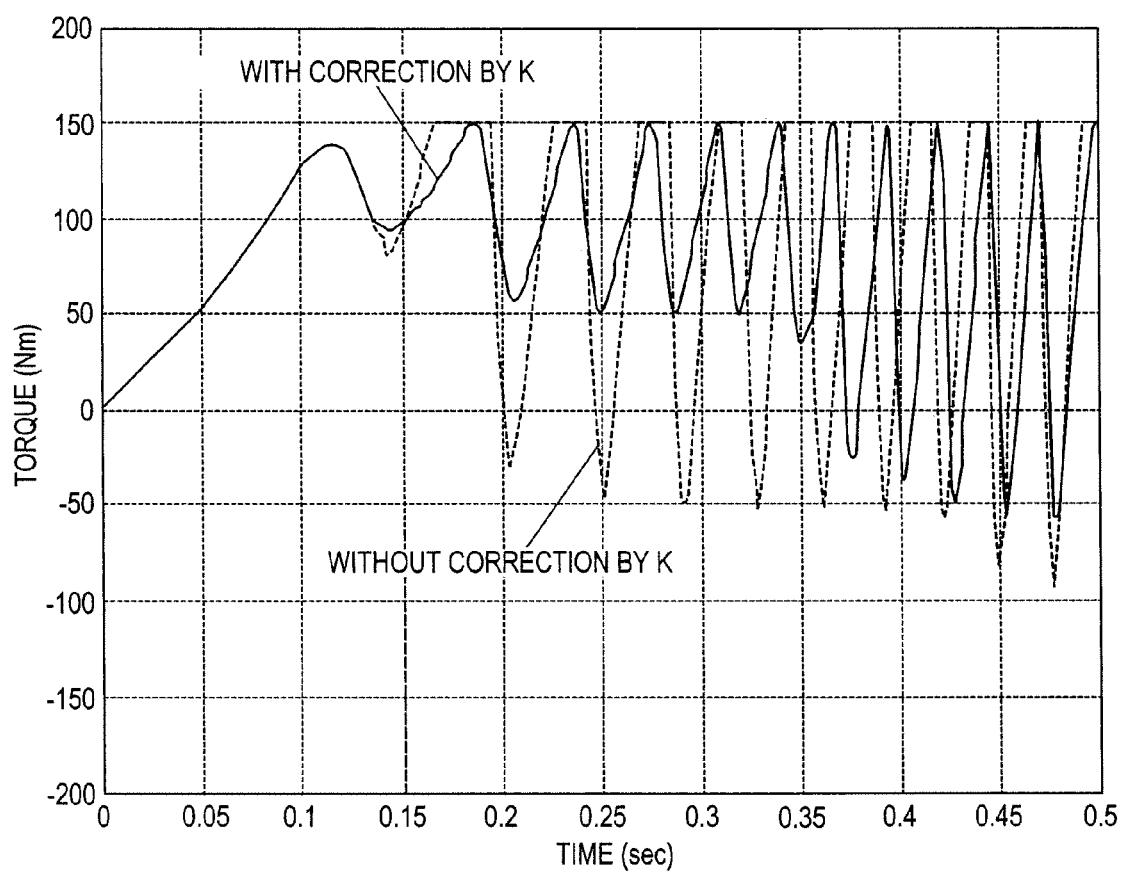
FIG. 12 is a diagram showing an example of the generated torque of a motor generator 2 during rolling vibration suppression control.

FIG. 12 shows an example of the torque generated by the motor generator 2 during rolling vibration suppression control. When a value obtained by adding the opposite phase of the torque variation in the engine 1 without modification to the basic torque value is used as the torque command value T, the torque command value T exceeds the maximum torque value $T_{max}$ that can be generated, and the torque is cut off at the maximum torque value $T_{max}$ that can be generated. However, in the second embodiment the torque command value T is calculated on the basis of a value obtained by multiplying the correction coefficient K by the torque variation in the engine 1, and hence the command value T of the motor generator 2 can always be held within the maximum torque value $T_{max}$ that can be generated.

Figure 13:
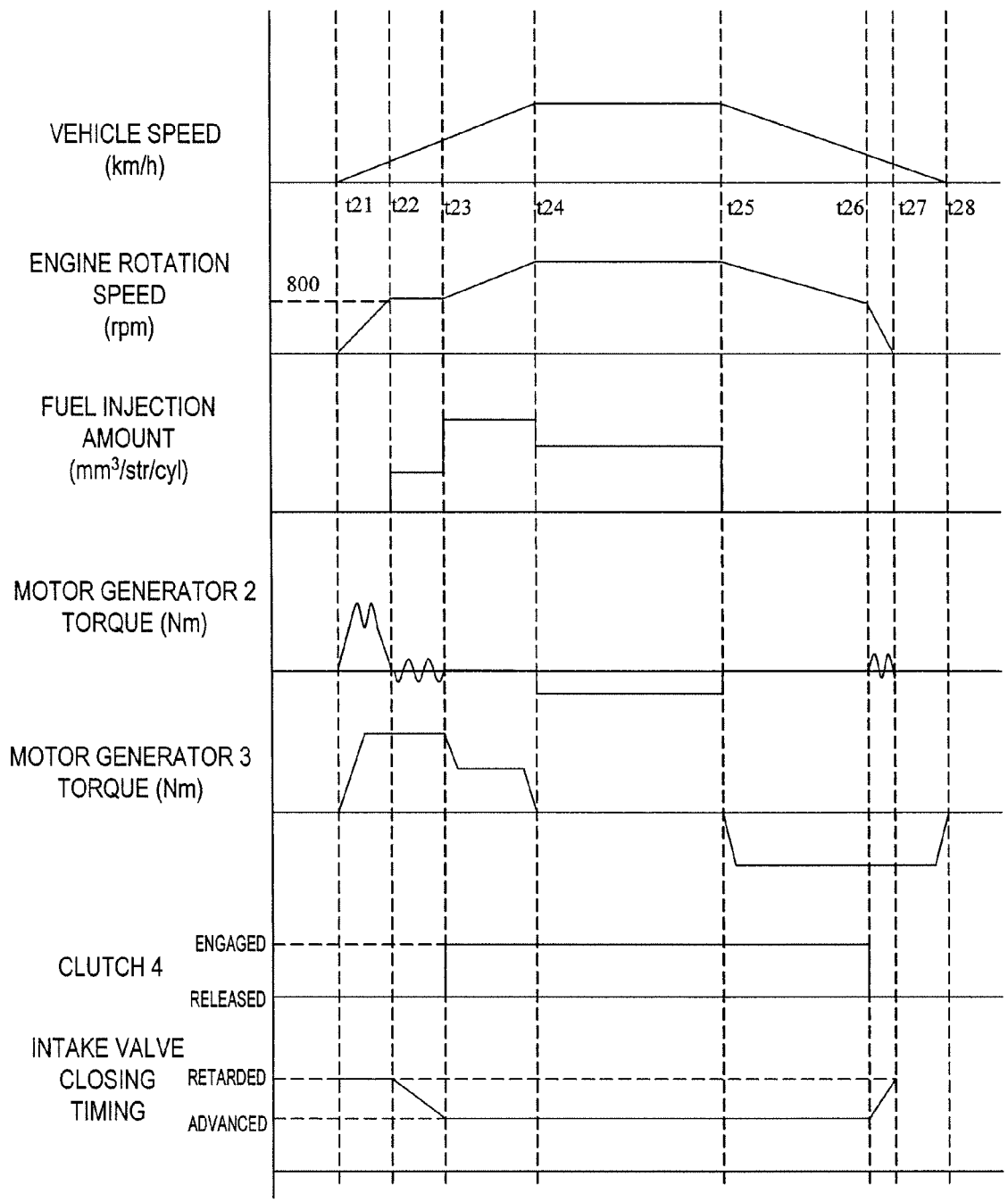
FIG. 13 is a time chart illustrating the actions and effects of the second embodiment.

FIG. 13 is a time chart showing a process starting when the vehicle begins to move from a stationary state and ending when the vehicle stops again. It is assumed that prior to a time $t_{21}$, the vehicle is in a stationary state with the engine 1 halted and the clutch 4 released.

At the time $t_{21}$, the accelerator pedal is depressed and the accelerator switch switches ON. Accordingly, the engine 1 is driven to rotate by the motor generator 2 so that the engine 1 is started. As a result, the rotation speeds of the engine 1 and the motor generator 2 increase.

At the same time, a torque command value for the motor generator 3 is calculated on the basis of the accelerator pedal position, and motor torque corresponding to the torque command value is generated from the motor generator 3. As a result, the vehicle is driven and the vehicle speed gradually rises.

When the rotation speed $N_e$ of the engine 1 reaches a predetermined value (800 rpm, for example) at a time $t_{22}$, fuel injection from injectors begins. Between the time $t_{21}$ and a time $t_{23}$, the rotation speed of the engine 1 is no greater than 800 rpm, and hence the implementation conditions for rolling vibration suppression control are established. Accordingly, rolling vibration suppression control is performed.

At the time $t_{23}$, the clutch 4 is engaged, and between the time $t_{23}$ and a time $t_{24}$, the vehicle is accelerated using the output of both the engine 1 and the motor generator 3.

From the time $t_{24}$ to a time $t_{25}$, the vehicle travels at a constant speed. At this time, the engine 1 is driven in a high efficiency region and power generation is performed by the motor generator 2 in order to store surplus energy in the battery 13.

When the accelerator switch switches OFF at the time $t_{25}$, fuel injection is halted, regeneration torque is generated from the motor generator 3, the vehicle decelerates, and the deceleration energy produced thereby is charged to the battery 13 as electrical energy.

When the vehicle speed falls to a predetermined value (10 km/h, for example) at a time $t_{26}$, the clutch 4 is released. At a time $t_{27}$, the engine 1 is stopped, and at a time $t_{28}$, the vehicle stops.

From the time $t_{26}$ to the time $t_{27}$, the engine rotation speed is no greater than 800 rpm, and therefore the implementation conditions for rolling vibration suppression control are established. Hence, similarly to the period extending from the time $t_{21}$ to the time $t_{23}$, rolling vibration suppression control is performed using the motor generator 2.

Figure 14:
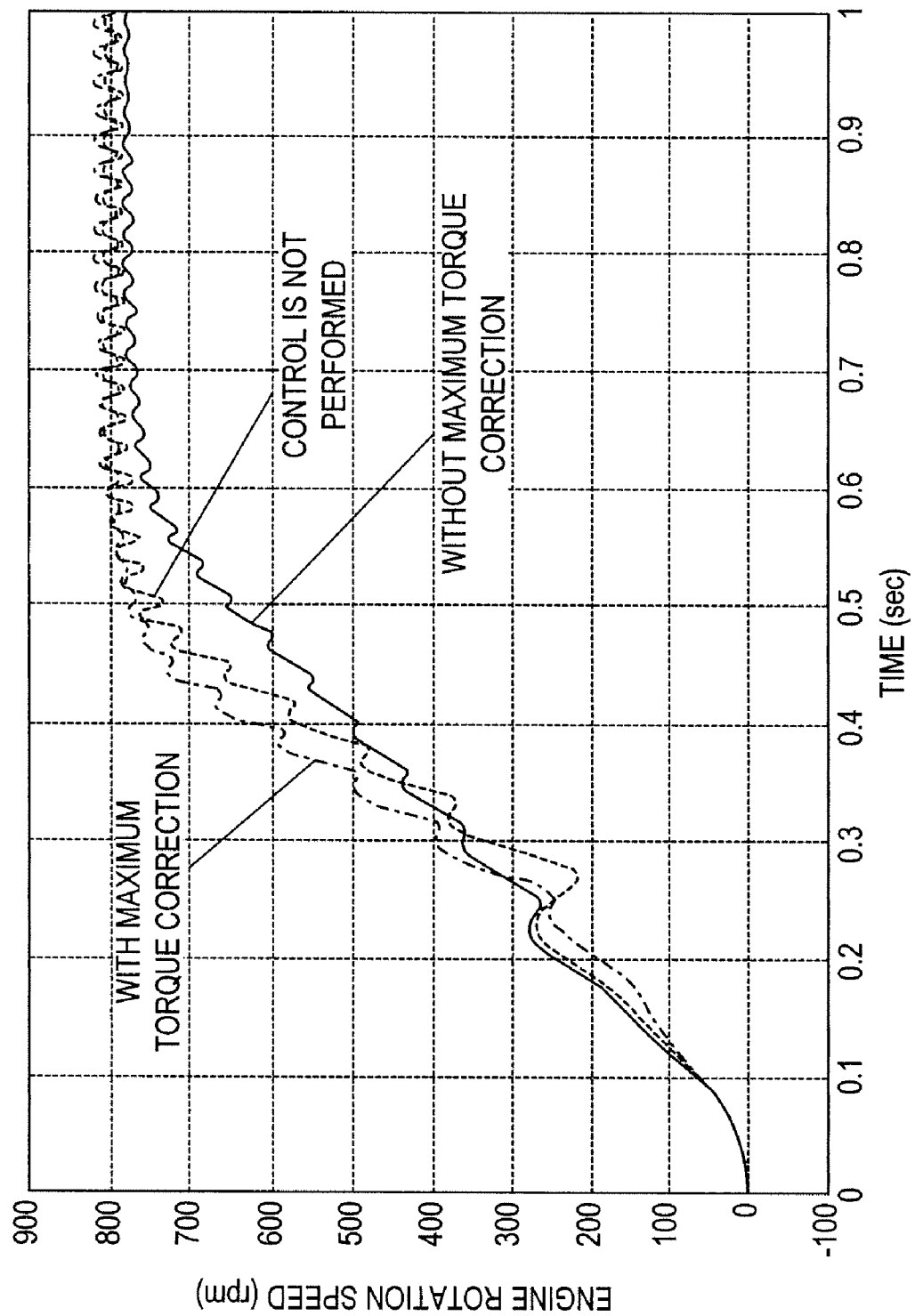
FIG. 14 is a diagram showing the manner in which the engine rotation speed changes during engine startup.
Figure 15:
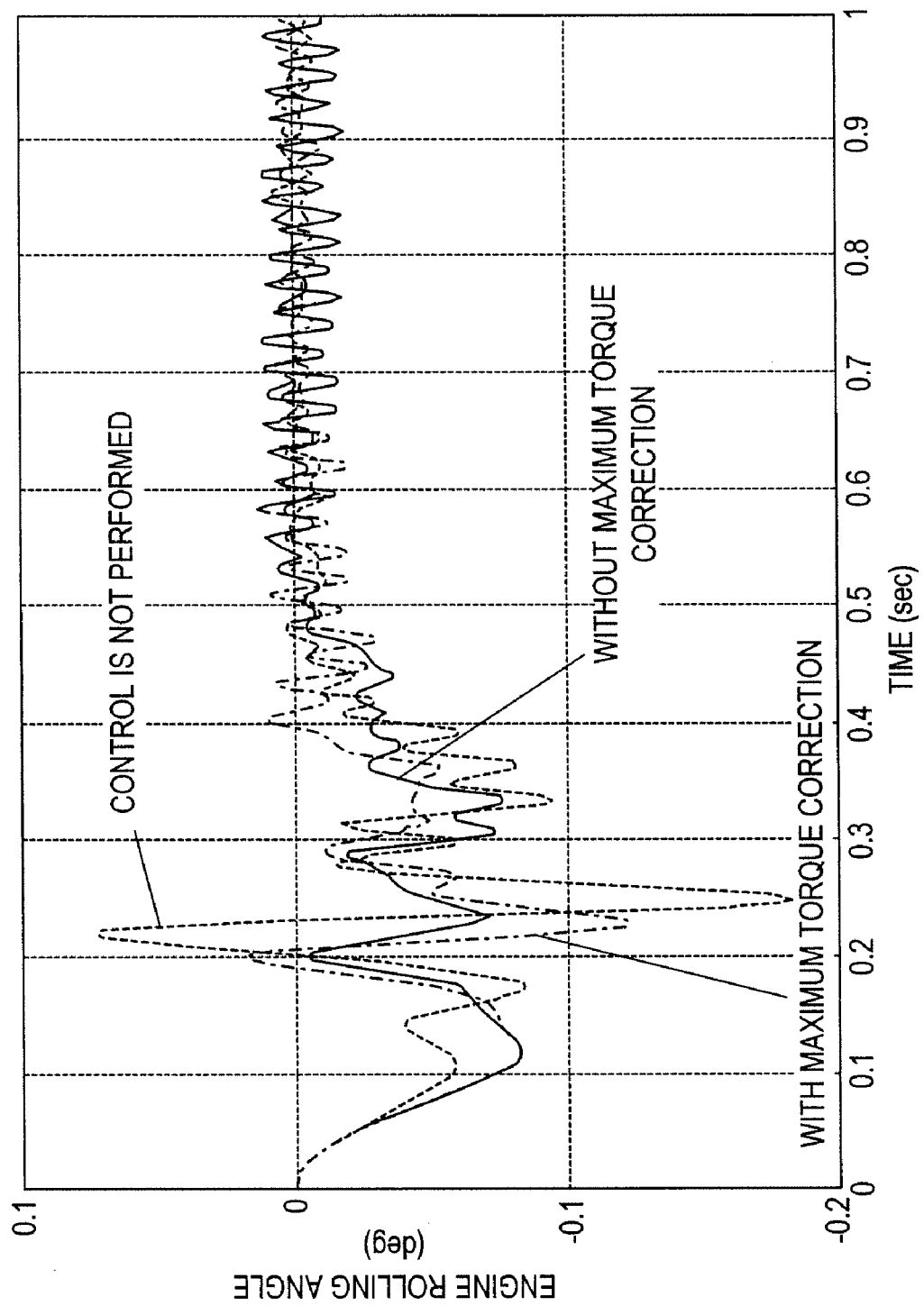
FIG. 15 is a diagram showing the manner in which the engine rolling angle changes during engine startup.

FIGS. 14 and 15 show the manner in which the rotation speed and rolling angle of the engine 1 vary during engine startup. As shown in the figures, when rolling vibration suppression control is performed, rolling vibration in the engine 1 during startup and subsequent idle running can be suppressed more effectively than when rolling vibration suppression control is not performed, and moreover, the rotation speed of the engine 1 can be raised smoothly and quickly.

Particularly in this embodiment, the torque correction amount of the motor generator 2 is corrected by the correction coefficient K to ensure that the torque command value T of the motor generator 2 does not exceed the maximum torque value $T_{max}$ that can be generated (maximum torque correction). Therefore, situations in which the motor generator 2 is unable to generate torque corresponding to the command value are avoided, and a higher vibration suppression effect than that obtained when this correction is not performed can be achieved.

Furthermore, rolling vibration suppression control is continued even during idle running of the engine 1 following the start of combustion, and hence a vibration reduction effect is obtained even during idle running.

The actions and effects of the second embodiment will now be summarized.

In addition to the actions and effects of the first embodiment, in the second embodiment an opposite phase torque of the torque obtained by multiplying the correction coefficient K by the torque variation in the engine 1 is calculated as the torque correction amount, and the correction coefficient K is set to a value no greater than 1 to ensure that the absolute value of a value obtained by adding the torque correction amount to the basic torque value $T_0$ does not exceed the maximum torque value $T_{max}$ that can be generated by the motor generator 2. As a result, a situation in which the motor generator 2 is unable to generate torque corresponding to the torque command value T, causing the average value of the torque that is actually generated by the motor generator 2 to fall below the basic torque $T_0$ such that the desired rotation increase speed cannot be obtained and the time required for startup increases, can be prevented.

Moreover, the correction coefficient K is updated when the torque variation in the engine 1 reaches zero, and hence the occurrence of steps in the torque correction amount can be suppressed. As a result, the occurrence of torque variation due to discontinuous change in the torque correction amount can be prevented.

Further, the maximum torque value $T_{max}$ m that can be generated by the motor generator 2 is determined on the basis of the charge state C of the battery 13, and hence when the charge state C of the battery 13 is low, the power consumption of the motor generator 2 can be suppressed and the power of the battery 13 can be conserved.

Third Embodiment

The constitution of a hybrid vehicle according to a third embodiment is identical to that of the first embodiment shown in FIG. 1 except that the motor generator 2 of the first embodiment has been replaced by a smaller motor generator 2. Accordingly, the amount of torque that can be generated by the motor generator 2 is restricted, and if the torque command value T is calculated by adding the torque correction amount, i.e. the opposite phase of the torque variation, without modification to the basic torque for driving the motor generator 2 to rotate, similarly to the first embodiment, the torque command value T may exceed the maximum torque value $T_{max}$ m that can be generated by the motor generator 2. As described in the second embodiment, if the torque command value T exceeds the maximum torque value $T_{max}$ m that can be generated by the motor generator 2, the desired rotation increase speed cannot be obtained and the time required for startup lengthens.

Hence in the third embodiment, the waveform of the torque correction amount of the motor generator 2 is changed appropriately such that the torque command value does not exceed the maximum torque value $T_{max}$ that can be generated by the motor generator 2.

Figure 16:
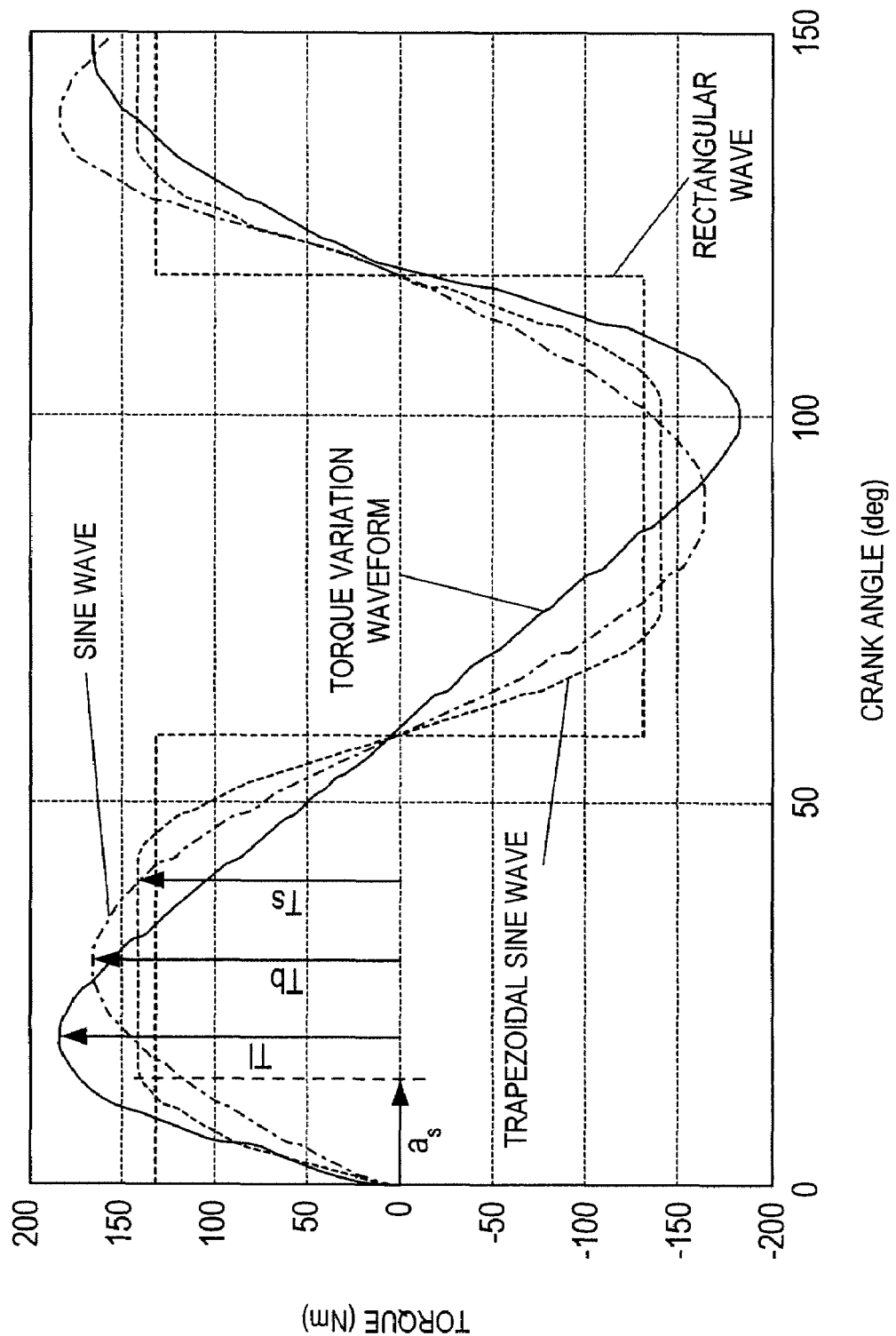
FIG. 16 is a diagram showing a relationship between a torque variation waveform and other waveforms.

The waveforms shown in FIG. 16 all have identical amplitudes and phases in relation to a rotation basic order component. By changing the waveforms, the amplitudes can be varied, even in relation to an identical rotation basic order component, such that the following amplitude relationship is established: waveform of engine 1 torque variation > sine wave > trapezoidal sine wave > rectangular wave. Here, a waveform in which a linear peak torque is connected by a half cycle sine wave is referred to as a trapezoidal sine wave.

Torque variation can be effectively reduced by generating opposite phase torque from the motor generator 2 at the same amplitude as the rotation basic order component of the torque variation. By changing the waveform, it is possible to reduce only the amplitude of the waveform without changing the rotation basic order component. The third embodiment focuses on this point to obtain a maximum torque variation reduction effect with limited torque by effectively employing these four waveforms.

As regards the torque following closure of the intake valve, the internal cylinder pressure is determined using Equation (2), and by determining $P_0$, $V_0$ at the time of intake valve closure, the torque variation accompanying the subsequent expansion and compression can be calculated. Therefore, by calculating the torque variation at 60 degrees before and after top dead center, at which the maximum value and minimum value of the torque variation occur, determng a maximum value $T_1$ and a minimum value $T_2$, and subjecting the torque variation waveform thereof to frequency analysis, an amplitude $T_b$ and a phase $P_b$ of the rotation basic order component of the torque variation in the engine 1 are determined.

Waveform selection is performed according to the following procedure on the basis of the maximum torque value $T_{max}$ that can be generated by the motor generator 2 and the basic torque value $T_0$, the maximum value $T_1$ and minimum value $T_2$ of the torque variation in the engine 1, and the amplitude $T_b$ and phase $P_b$ of the rotation basic order component First, when the larger of the absolute values of values obtained by subtracting the maximum value $T_1$ and minimum value $T_2$ respectively from the basic torque value $T_0$ is smaller than the maximum torque value $T_{max}$ that can be generated by the motor generator 2, or in other words when the relationship of the following Equation (6) is established, the opposite phase of a value obtained by multiplying the torque variation by −1 is set without modification as the torque correction amount, and a value obtained by adding the torque correction amount to the basic torque value $T_0$ is set as the torque command value T (as in the first embodiment).

$$\max(|T_0-T_1|,|T_0-T_2|) \leq T_{max} \qquad (6)$$

However, if the torque command value T is calculated using the same method as that of the first embodiment when the relationship of Equation (6) is not established, the torque command value T exceeds the maximum torque value $T_{max}$ that can be generated. Hence, in this case, a determination is made as to whether or not the relationship of the following Equation (7) is established.

$$T_0+T_b \leq T_{max} \qquad (7)$$

If the relationship is established, a sine wave is selected as the waveform of the torque correction amount. More specifically, a sine wave in which the amplitude and phase of the rotation basic order component equal the amplitude $T_b$ and phase $P_b$ of the rotation basic order component of the torque variation is determined, and the opposite phase of this sine wave is set as the torque correction amount. In so doing, a torque correction amount which suppresses the rotation basic order component of the torque variation can be applied, enabling a reduction in torque variation.

When the relationship of Equation (7) is not established, a further determination is made from the ratio π/4 of the amplitude of the rectangular wave and the basic order component thereof as to whether or not the relationship of the following Equation (8) is established.

$$T_0+(\pi/4)T_b \leq T_{max} \qquad (8)$$

If the relationship is established, a trapezoidal sine wave is selected as the waveform of the torque correction amount, and a trapezoidal sine wave in which the amplitude and phase of the rotation basic order component equal the amplitude $T_b$ and phase $P_b$ of the rotation basic order component of the torque variation is determined. The opposite phase of this trapezoidal sine wave is then set as the torque correction amount.

A relationship of $$T_s = \frac{4T_b}{\pi}\left(\frac{4a_s^2}{\pi^2-4a_s^2}+1\right) \qquad (9)$$

where $a_s$: ¼ cycle sine wave phase angle exists between an amplitude $T_s$ of the trapezoidal sine wave shown in FIG. 16 and the rotation basic order component $T_b$, and therefore, by determining the ¼ cycle sine wave phase angle $a_s$ when $$T_s = T_{max} - |T_0| \qquad (10)$$

is established, a trapezoidal sine wave having the rotation basic order component $T_b$ can be determined. Then, by further determining a trapezoidal sine wave having the phase $P_b$, a trapezoidal sine wave in which the amplitude and phase of the rotation basic order component are equal to the amplitude $T_b$ and phase $P_b$ of the rotation basic order component of the torque variation can be determined. The trapezoidal sine wave has a smaller high frequency component than the rectangular wave, and therefore by selecting the trapezoidal sine wave, an effect of reducing the rotation basic order component can be obtained while suppressing deterioration of the high frequency component to a minimum.

On the other hand, when the relationship of Equation (8) is not established, the opposite phase of a rectangular wave having an amplitude of $T_{max}-|T_0|$ and the phase $P_b$ is used for torque correction. In this case, the amplitude of the rotation basic order component is smaller than the amplitude $T_b$ of the rotation basic order component of the torque variation. However, the rectangular wave has the greatest rotation basic order component relative to amplitude, and hence the torque variation can be suppressed to the greatest extent possible with the limited torque of the motor generator 2.

Here, the maximum torque value $T_{max}$ that can be generated by the motor generator 2 is determined taking not only the maximum torque (rated torque) of the motor generator 2 into consideration, but also the charge state C of the battery 13 at that time. More specifically, when the battery 13 is charged sufficiently, torque is generated up to the maximum torque of the motor generator 2, but when the charge state C of the battery 13 falls below a predetermined value (60% or less, for example) so that the power of the battery 13 must be conserved, the value of the maximum torque value $T_{max}$ that can be generated decreases in accordance with the charge state C of the battery 13.

Figure 17:
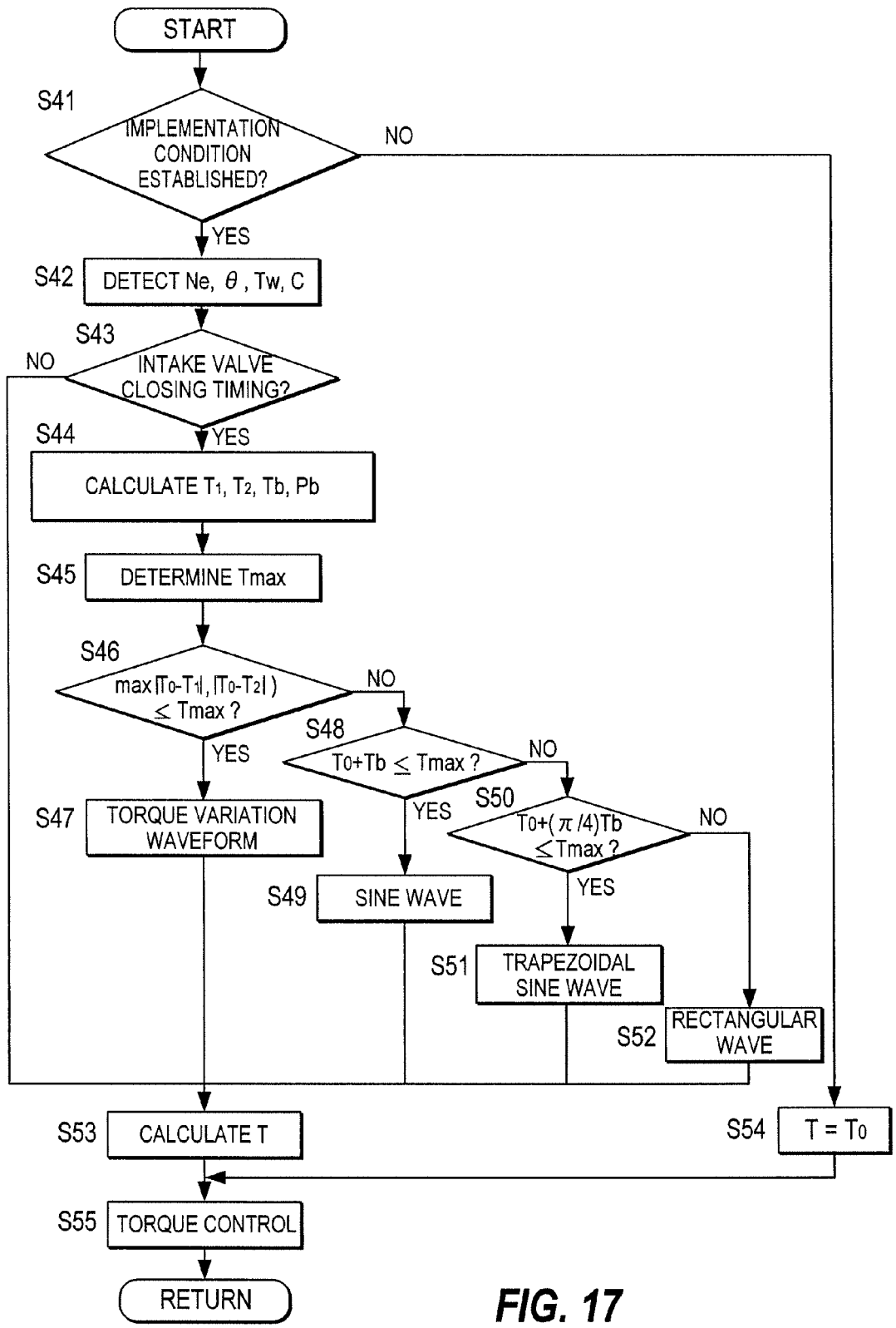
FIG. 17 is a flowchart showing the content of rolling vibration suppression control performed by a controller in a third embodiment.

FIG. 17 shows the content of rolling vibration suppression control of the engine 1 executed by the controller 20. This flow is executed repeatedly by the controller 20 at predetermined time intervals (of 10 msec, for example).

First, in a step S41, a determination is made as to whether or not implementation conditions for rolling vibration suppression control have been established. The implementation conditions are determined to have been established when the rotation speed $N_e$ of the engine 1 is no less than 0 rpm and fuel injection is not underway in the engine 1, for example. A condition whereby the rotation speed $N_e$ of the engine 1 is no greater than a predetermined rotation speed (800 rpm, for example) may be used instead of the condition that fuel injection is not underway.

When the conditions are established, the flow advances to a step S42 onward, and when the conditions are not established, the flow advances to a step S54, where the basic torque value $T_0$ for driving the motor generator 2 to rotate is set without modification as the torque command value T of the motor generator 2.

In the step S42, the rotation speed $N_e$, crank angle θ, and engine water temperature $T_w$ of the engine 1, and charge state C of the battery 13, which are required for the rolling vibration suppression control, are detected. The crank angle θ is detected with exhaust top dead center of the first cylinder set at zero degrees.

In a step S43, a determination is made as to whether or not the intake valve closing timing has arrived. If not, the flow advances to a step S53, where the torque correction amount is calculated with the same waveform as that used previously. The torque command value T is then calculated by adding the torque correction amount to the basic torque value $T_0$.

When the intake valve closing timing has arrived, the flow advances to a step S44, where the maximum value $T_1$ and minimum value $T_2$ of the torque variation in the engine 1 and the amplitude $T_b$ and phase $P_b$ of the rotation basic order component of the torque variation are calculated.

In a step S45, the maximum torque value $T_{max}$ that can be generated by the motor generator 2 is determined on the basis of the charge state C of the battery 13.

In a step S46, a determination is made as to whether or not the relationship of Equation (6) has been established, and if so, the flow advances to a step S47, where the waveform of the torque correction amount is set as the opposite phase of the torque variation in the engine 1.

When the relationship has not been established, the flow advances to a step S48, where a determination is made as to whether or not the relationship of Equation (7) has been established. If so, the flow advances to a step S49, where the sine wave is selected as the waveform of the torque correction amount.

When the relationship is not established, the flow advances to a step S50, where a determination is made as to whether or not the relationship of Equation (8) has been established. If so, the flow advances to a step S51, where the trapezoidal sine wave is selected as the waveform of the torque correction amount. If the relationship is not established, the flow advances to a step S52, where the rectangular wave is selected as the waveform of the torque correction amount.

Once the waveform of the torque correction amount has been selected in the steps S47 to S52, the flow advances to a step S53, where the torque correction amount is calculated in accordance with the respective torque variation waveforms and the torque command value T is calculated by adding the torque correction amount to the basic torque value $T_0$.

In a step S55, the torque command value T calculated in the step S53 or S54 is transmitted to the inverter 11. The inverter 11 supplies the motor generator 2 with a field current for generating torque corresponding to the torque command value T, and thus the torque of the motor generator 2 is controlled.

Figure 18:
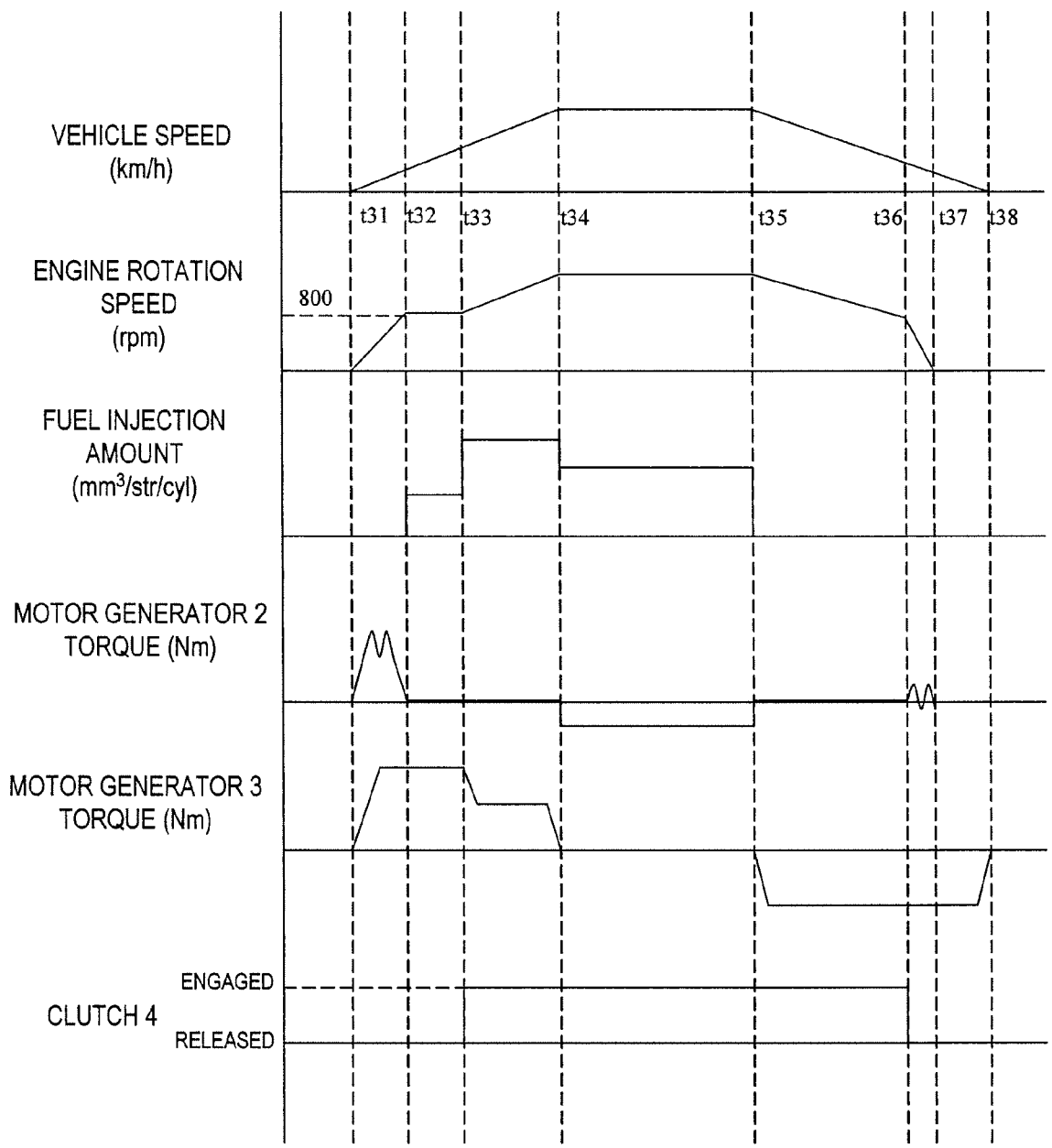
FIG. 18 is a time chart illustrating the actions and effects of the third embodiment

FIG. 18 is a time chart showing a process starting when the vehicle begins to move from a stationary state and ending when the vehicle stops again. It is assumed that prior to a time $t_{31}$, the vehicle is in a stationary state with the engine 1 halted and the clutch 4 released.

At the time $t_{31}$, the accelerator pedal is depressed and the accelerator switch switches ON. Accordingly, the engine 1 is driven to rotate by the motor generator 2 so that the engine 1 is started. As a result, the rotation speeds of the engine 1 and the motor generator 2 increase.

At the same time, a torque command value for the motor generator 3 is calculated on the basis of the accelerator pedal position, and the motor generator 3 is caused to generate torque corresponding to the torque command value. As a result, the vehicle is driven and the vehicle speed gradually rises.

Between the time $t_{31}$ and a time $t_{32}$, the rotation speed of the engine 1 is no greater than 800 rpm and fuel injection is not underway, and hence the implementation conditions for rolling vibration suppression control are established. Therefore, rolling vibration suppression control is performed. More specifically, by calculating torque variation generated in the engine output shaft when the engine 1 is in a motoring state, and adding a torque correction amount corresponding to the opposite phase thereof to the basic torque value $T_0$ for driving the motor generator 2 to rotate, the torque command value for the motor generator 2 is corrected, and the torque of the motor generator 2 is controlled. At this time, the waveform of the torque command value T is selected from among the torque variation waveform, the sine wave, the trapezoidal sine wave, and the rectangular wave to ensure that the torque command value T does not exceed the maximum torque value $T_{max}$ that can be generated by the motor generator 2.

When the rotation speed $N_e$ of the engine 1 reaches a predetermined value (800 rpm, for example) at the time $t_{32}$, fuel injection from injectors begins. When fuel injection begins, the implementation conditions for rolling vibration suppression control are no longer established, and therefore rolling vibration suppression control is stopped.

At a time $t_{33}$, the clutch 4 is engaged, and from a time $t_{33}$ to a time $t_{34}$, the vehicle is accelerated using the output of both the engine 1 and the motor generator 3. From the time $t_{34}$ to a time $t_{35}$, the vehicle travels at a constant speed. At this time, the engine 1 is driven in a high efficiency region and power generation is performed by the motor generator 2 in order to store surplus energy in the battery.

When the accelerator switch switches OFF at the time $t_{35}$, fuel injection is halted, regeneration torque is generated from the motor generator 3, the vehicle decelerates, and the deceleration energy produced thereby is charged to the battery 13 as electrical energy.

When the vehicle speed falls to a predetermined value (10 km/h, for example) at a time $t_{36}$, the clutch 4 is released. At a time $t_{37}$, the engine 1 is stopped, and at a time $t_{38}$, the vehicle stops.

From the time $t_{36}$ to the time $t_{37}$, the engine 1 rotation speed is no greater than 800 rpm and fuel injection is not underway. Therefore, the implementation conditions for rolling vibration suppression control are established, and similarly to the period extending from the time $t_{31}$ to the time $t_{32}$, rolling vibration suppression control is performed.

Figure 19:
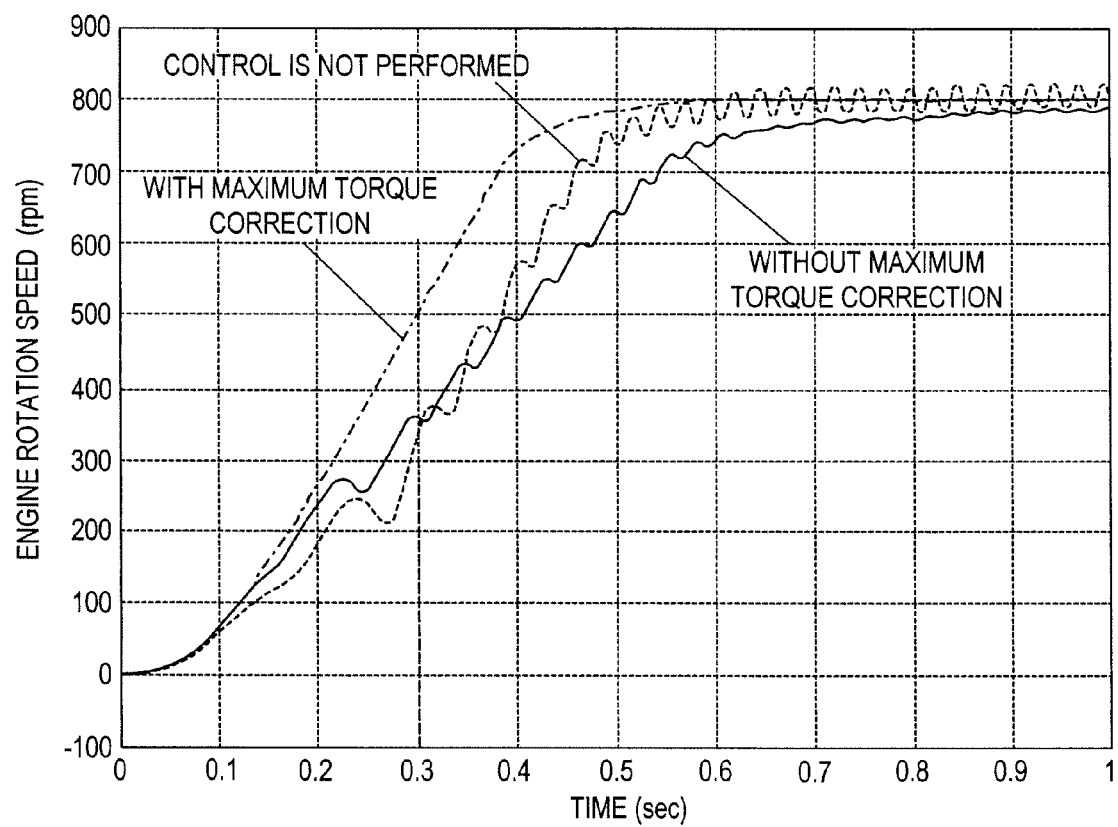
FIG. 19 is a diagram showing the manner in which the engine rotation speed changes during engine startup.
Figure 20:
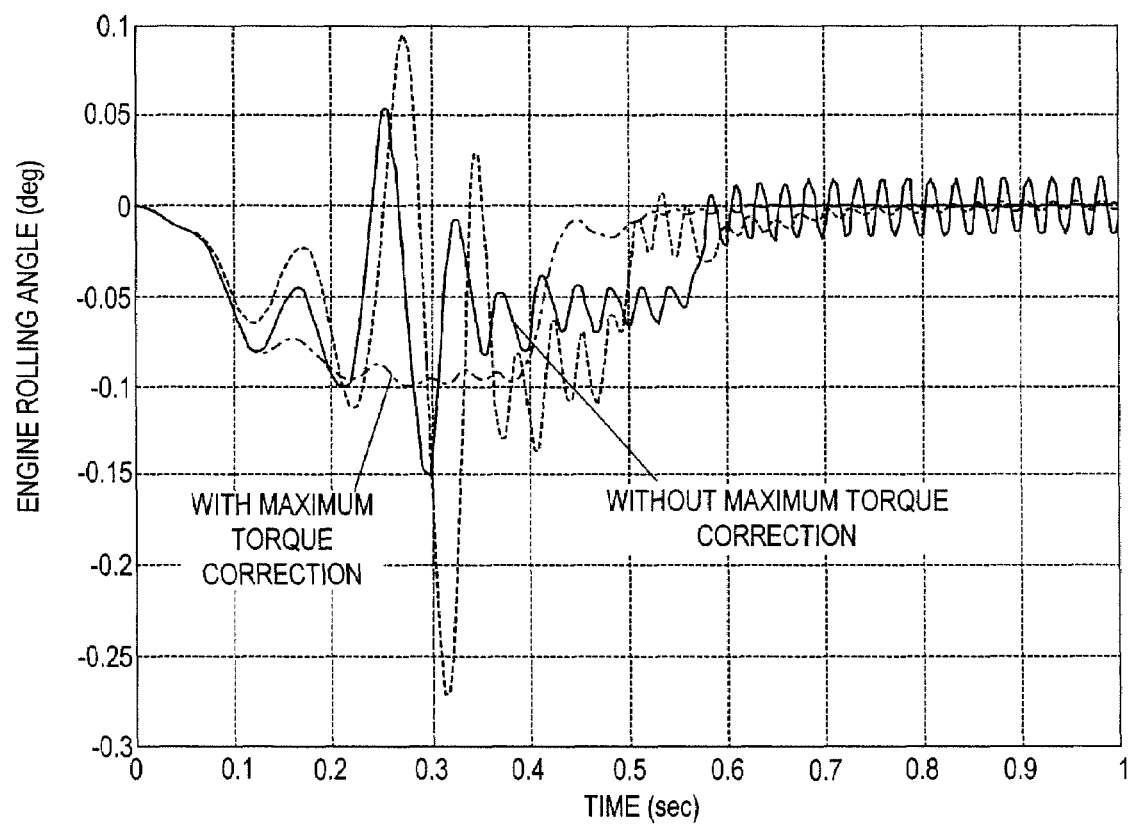
FIG. 20 is a diagram showing the manner in which the engine rolling angle changes during engine startup.

FIGS. 19 and 20 show the manner in which the rotation speed and rolling angle of the engine 1 vary during engine startup in the third embodiment. In the third embodiment, the motor generator 2 is reduced in size and weight, and hence the torque that can be generated thereby is limited. As described above, however, the waveform of the torque correction amount is selected to ensure that the torque command value T does not exceed the maximum torque value $T_{max}$ that can be generated, and therefore engine vibration during startup can be reduced without reductions in the rotation increase speed. As a result, the engine rotation speed can be raised within the necessary startup period.

The actions and effects of the third embodiment will now be summarized.

In addition to the actions and effects of the first embodiment, when the absolute value of the difference between the maximum value $T_1$ or minimum value $T_2$ of the torque variation in the engine 1 and the basic torque value $T_0$ is greater than the maximum torque value $T_{max}$ that can be generated by the motor generator 2, the waveform of the torque correction amount is changed in accordance with the operating conditions of the engine 1 and the motor generator 2 to ensure that the torque command value T does not exceed the maximum torque value $T_{max}$ that can be generated by the motor generator 2. More specifically, when the torque of the motor generator 2 is insufficient, the rotation basic order component of the torque variation can be suppressed while suppressing the motor command value T to or below the maximum value of the torque that can be generated by the motor by employing the opposite phase of a waveform in which the phase of the rotation basic order component is equal to the phase $P_b$ of the rotation basic order component of the engine torque variation and the amplitude of the waveform is smaller than the amplitude of the rotation basic order component as the waveform of the torque correction amount. In so doing, a favorable vibration suppression effect can be expected.

At this time, when the absolute value of the difference between the maximum value $T_1$ or minimum value $T_2$ of the torque variation in the engine 1 and the basic torque value $T_0$ is greater than the maximum torque value $T_{max}$ that can be generated by the motor generator 2, but a value obtained by adding the amplitude $T_b$ of the rotation basic order component of the torque variation in the engine 1 to the basic torque value $T_0$ is smaller than the maximum torque value $T_{max}$ nm that can be generated by the motor generator 2, the opposite phase of a sine wave having an identical amplitude to the rotation basic order component of the torque variation in the engine 1 is used as the waveform of the torque correction amount. When the value obtained by adding the amplitude $T_b$ of the rotation basic order component of the torque variation in the engine 1 to the basic torque value $T_0$ is larger than the maximum torque value $T_{max}$ that can be generated by the motor generator 2, but a value obtained by adding a π/4 multiple of the amplitude of the rotation basic order component of the torque variation in the engine 1 to the basic torque value $T_0$ is smaller than the maximum torque value $T_{max}$ that can be generated by the motor generator 2, the opposite phase of a trapezoidal sine wave having an identical amplitude to the rotation basic order component of the torque variation in the engine 1 is used as the waveform of the torque correction amount. In so doing, the rotation basic order component of the torque variation can be suppressed sufficiently while preventing deterioration of the other frequency components, and therefore a favorable vibration suppression effect can be expected with the limited torque of the motor generator 2.

When the value obtained by adding a π/4 multiple of the amplitude of the rotation basic order component of the torque variation in the engine 1 to the basic torque value $T_0$ is larger than the maximum torque value $T_{max}$ that can be generated by the motor generator 2, the opposite phase of a rectangular wave having an amplitude which is equal to a value obtained by subtracting the basic torque value $T_0$ from the maximum torque value $T_{max}$ that can be generated by the motor generator 2 is used as the waveform of the torque correction amount. The rectangular wave has the largest rotation basic order component relative to the amplitude, and hence the rotation basic order component of the torque variation can be suppressed to the greatest extent possible with the limited torque of the motor generator 2.

It should be noted that in the third embodiment, the waveform is changed in succession from the waveform corresponding to the torque variation to the sine wave, the trapezoidal sine wave, and the rectangular wave as the leeway in the torque that can be generated by the motor generator 2 in relation to the torque variation in the engine 1 becomes smaller. However, the changed waveforms and the change order thereof may be varied appropriately. For example, the waveform which follows the sine wave may be the rectangular wave rather than the trapezoidal sine wave, or the waveform-m may be deformed smoothly from the waveform corresponding to the torque variation to the rectangular waveform.

Moreover, similarly to the second embodiment, the maximum torque value $T_{max}$ that can be generated by the motor generator 2 may be determined on the basis of the charge state C of the battery 13 such that when the charge state C of the battery 13 is low, the power consumption of the motor generator 2 can be suppressed and the power of the battery 13 can be conserved.

The entire contents of Japanese Patent Application Number 2005-322059 (filed Nov. 7, 2005) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. An engine vibration suppression device for an engine in which a rotating electrical machine is connected to an engine output shaft, comprising:
   a controller connected to the rotating electrical machine configured to:
      estimate an internal cylinder pressure of the engine on the basis of an operating condition of the engine;
      calculate a torque variation in the engine on the basis of the estimated internal cylinder pressure;
      calculate an opposite phase torque of the torque variation in the engine as a torque correction amount;
      calculate a torque command value of the rotating electrical machine by adding the torque correction amount to a basic torque value for driving the rotating electrical machine to rotate; and
      torque-control the rotating electrical machine such that a torque of the rotating electrical machine is equal to the torque command value.

2. The engine vibration suppression device as defined in claim 1, wherein the controller calculates the internal cylinder pressure of the engine on the basis of a crank angle, an intake air pressure, and a compression start timing of a compression stroke of the engine.

3. The engine vibration suppression device as defined in claim 2, wherein the controller calculates the internal cylinder pressure in a compression/expansion stroke on the basis of the crank angle and the intake air pressure at the compression start timing of the compression stroke of the engine.

4. The engine vibration suppression device as defined in claim 2, wherein the controller sets an intake valve closing timing of the engine as the compression start timing.

5. The engine vibration suppression device as defined in claim 2, wherein the controller sets a rotation start time of the engine as the compression start timing when the engine begins to rotate from a midway point in the compression stroke during an engine startup.

6. The engine vibration suppression device as defined in claim 1, wherein the controller corrects the internal cylinder pressure on the basis of at least one of a temperature and a rotation speed of the engine.

7. The engine vibration suppression device as defined in claim 1, wherein the controller calculates an opposite phase of a value obtained by multiplying a correction coefficient by the torque variation in the engine as the torque correction amount, and
   sets the correction coefficient to a value no greater than 1 to ensure that an absolute value of the value obtained by adding the torque correction amount to the basic torque value does not exceed a maximum value of the torque that can be generated by the rotating electrical machine.

8. The engine vibration suppression device as defined in claim 7, wherein the controller updates the correction coefficient when the torque variation in the engine reaches zero.

9. The engine vibration suppression device as defined in claim 7, wherein a battery which supplies power to the rotating electrical machine is connected to the rotating electrical machine, and the controller determines the maximum value of the torque that can be generated by the rotating electrical machine on the basis of a charge state of the battery.

10. The engine vibration suppression device as defined in claim 1, wherein the controller changes a waveform of the torque correction amount in accordance with the operating conditions of the engine and the rotating electrical machine such that the torque command value does not exceed a maximum value of the torque that can be generated by the rotating electrical machine when an absolute value of a difference between a maximum value or a minimum value of the torque variation in the engine and the basic torque is larger than the maximum value of the torque that can be generated by the rotating electrical machine.

11. The engine vibration suppression device as defined in claim 10, wherein the controller changes the waveform of the torque correction amount to an opposite phase of a waveform in which a phase of a rotation basic order component is equal to a phase of a rotation basic order component of the torque variation in the engine and an amplitude of the waveform is smaller than an amplitude of the rotation basic order component.

12. The engine vibration suppression device as defined in claim 11, wherein the controller changes the waveform of the torque correction amount to an opposite phase of a sine wave having an identical amplitude to the rotation basic order component of the torque variation in the engine.

13. The engine vibration suppression device as defined in claim 12, wherein the controller changes the waveform of the torque correction amount to the opposite phase of the sine wave when the absolute value of the difference between the maximum value or the minimum value of the torque variation in the engine and the basic torque is larger than the maximum value of the torque that can be generated by the rotating electrical machine, and a value obtained by adding an amplitude of the rotation basic order component of the torque variation in the engine to the basic torque value is smaller than the maximum value of the torque that can be generated by the rotating electrical machine.

14. The engine vibration suppression device as defined in claim 13, wherein the controller changes the waveform of the torque correction amount to an opposite phase of a rectangular wave when the value obtained by adding a $\pi/4$ multiple of the amplitude of the rotation basic order component of the torque variation in the engine to the basic torque value is larger than the maximum value of the torque that can be generated by the rotating electrical machine.

15. The engine vibration suppression device as defined in claim 10, wherein the controller changes the waveform of the torque correction amount to an opposite phase of a trapezoidal sine wave having an identical amplitude to the rotation basic order component of the torque variation in the engine.

16. The engine vibration suppression device as defined in claim 15, wherein the controller changes the waveform of the torque correction amount to the opposite phase of the trapezoidal sine wave when the value obtained by adding the amplitude of the rotation basic order component of the torque variation in the engine to the basic torque value is larger than the maximum value of the torque that can be generated by the rotating electrical machine, and a value obtained by adding a $\pi/4$ multiple of the amplitude of the rotation basic order component of the torque variation in the engine to the basic torque value is smaller than the maximum value of the torque that can be generated by the rotating electrical machine.

17. The engine vibration suppression device as defined in claim 15, wherein the controller changes the waveform of the torque correction amount to the opposite phase of the trapezoidal sine wave when the value obtained by adding the amplitude of the rotation basic order component of the torque variation in the engine to the basic torque value is larger than the maximum value of the torque that can be generated by the rotating electrical machine, and a value obtained by adding a $\pi/4$ multiple of the amplitude of the rotation basic order component of the torque variation in the engine to the basic torque value is smaller than the maximum value of the torque that can be generated by the rotating electrical machine.

18. The engine vibration suppression device as defined in claim 17, wherein the controller changes the waveform of the torque correction amount to an opposite phase of a rectangular wave when the value obtained by adding a $\pi/4$ multiple of the amplitude of the rotation basic order component of the torque variation in the engine to the basic torque value is larger than the maximum value of the torque that can be generated by the rotating electrical machine.

19. The engine vibration suppression device as defined in claim 10, wherein the controller changes the waveform of the torque correction amount to an opposite phase of a rectangular wave having an equal amplitude to a value obtained by subtracting the basic torque value from the maximum value of the torque that can be generated by the rotating electrical machine.

20. The engine vibration suppression device as defined in claim 19, wherein the controller changes the waveform of the torque correction amount to the opposite phase of the rectangular wave when the value obtained by adding a $\pi/4$ multiple of the amplitude of the rotation basic order component of the torque variation in the engine to the basic torque value is larger than the maximum value of the torque that can be generated by the rotating electrical machine.

21. The engine vibration suppression device as defined in claim 10, wherein a battery which supplies power to the rotating electrical machine is connected to the rotating electrical machine, and the controller determines the maximum value of the torque that can be generated by the rotating electrical machine on the basis of a charge state of the battery.

22. The engine vibration suppression device as defined in claim 1, wherein the controller calculates the torque command value by adding the torque correction amount to the basic torque value when the rotation speed of the engine is lower than a predetermined rotation speed.

23. The engine vibration suppression device as defined in claim 1, wherein the controller calculates the torque command value by adding the torque correction amount to the basic torque value when combustion is not underway in the engine.

24. An engine vibration suppression device for an engine in which a rotating electrical machine is connected to an engine output shaft, comprising:
   means for estimating an internal cylinder pressure of the engine on the basis of an operating condition of the engine;
   means for calculating a torque variation in the engine on the basis of the estimated internal cylinder pressure;
   means for calculating an opposite phase torque of the torque variation in the engine as a torque correction amount;
   means for calculating a torque command value of the rotating electrical machine by adding the torque correction amount to a basic torque value for driving the rotating electrical machine to rotate; and
   means for torque-controlling the rotating electrical machine such that a torque of the rotating electrical machine is equal to the torque command value.

25. An engine vibration suppression method for an engine in which a rotating electrical machine is connected to an engine output shaft, comprising:

estimating an internal cylinder pressure of the engine on the basis of an operating condition of the engine;

calculating a torque variation in the engine on the basis of the estimated internal cylinder pressure;

calculating an opposite phase torque of the torque variation in the engine as a torque correction amount;

calculating a torque command value of the rotating electrical machine by adding the torque correction amount to a basic torque value for driving the rotating electrical machine to rotate; and torque-controlling the rotating electrical machine such that a torque of the rotating electrical machine is equal to the torque command value.

* * * * *